United States Patent
Minor

(10) Patent No.: US 11,887,233 B2
(45) Date of Patent: Jan. 30, 2024

(54) MACHINE LEARNING ACCELERATION OF COMPLEX DEFORMATIONS SUCH AS MUSCLE, SKIN AND CLOTHING SIMULATION

(71) Applicant: David Sebastian Minor, Vancouver (CA)

(72) Inventor: David Sebastian Minor, Vancouver (CA)

(73) Assignee: Digital Domain Virtual Human (US), Inc., Los Angeles, CA (US)

(*) Notice: Subject to any disclaimer, the term of this patent is extended or adjusted under 35 U.S.C. 154(b) by 211 days.

(21) Appl. No.: 17/676,087

(22) Filed: Feb. 18, 2022

(65) Prior Publication Data
US 2023/0267666 A1    Aug. 24, 2023

(51) Int. Cl.
*G06T 13/40* (2011.01)
*G06T 19/00* (2011.01)
*G06N 3/08* (2023.01)
*G06T 17/20* (2006.01)

(52) U.S. Cl.
CPC .............. *G06T 13/40* (2013.01); *G06N 3/08* (2013.01); *G06T 17/20* (2013.01); *G06T 19/00* (2013.01)

(58) Field of Classification Search
None
See application file for complete search history.

(56) References Cited

U.S. PATENT DOCUMENTS

| | | | |
|---|---|---|---|
| 10,950,024 B2* | 3/2021 | Comer | .............. G06F 18/23213 |
| 11,127,163 B2* | 9/2021 | Hesse | .................... G06T 17/205 |
| 2009/0153551 A1* | 6/2009 | Park | ........................ G06T 19/20 |
| | | | 345/419 |
| 2020/0327418 A1* | 10/2020 | Lyons | ....................... G06T 7/75 |

OTHER PUBLICATIONS

Joo et al. "Total capture: A 3d deformation model for tracking faces, hands, and bodies." Proceedings of the IEEE conference on computer vision and pattern recognition. 2018 (Year: 2018).*
Bailey et al., Fast and Deep Deformation Approximations. ACM Trans. Graph., vol. 37, No. 4, Article 119. Publication date: Aug. 2018.
Kry et al., EigenSkin: Real Time Large Deformation Character Skinning in Hardware. Published in SCA '02 Jul. 21, 2002, Computer Science.
Molchanov et al., Variational Dropout Sparsifies Deep Neural Networks. Proceedings of the 34th International Conference on Machine Learning, Sydney, Australia, PMLR 70, 2017.
Srebro et al., Weighted Low-Rank Approximations. Dept. of Electrical Engineering and Computer Science, Massachusetts Institute of Technology, Cambridge, MA. Proceedings of the Twentieth International Conference on Machine Learning (ICML-2003), Washington DC, 2003.

* cited by examiner

*Primary Examiner* — Saptarshi Mazumder
(74) *Attorney, Agent, or Firm* — Todd A. Rattray; Oyen Wiggs Green & Mutala LLP

(57) ABSTRACT

Methods and systems are provided preparing training data for training a neural network to simulate deformations of a surface of a CG character, for training a neural network to simulate deformations of a surface of a CG character and for employing a neural network to simulate deformations of a surface of a CG character. Matrix decomposition techniques are used to generate the training data and are subsequently used by trained neural networks during inference to recon- (Continued)

struct CG character surfaces. The inference methods and systems are suitable for real time animation applications.

20 Claims, 10 Drawing Sheets

MACHINE LEARNING ACCELERATION OF COMPLEX DEFORMATIONS SUCH AS MUSCLE, SKIN AND CLOTHING SIMULATION

TECHNICAL FIELD

This application relates to computer-based graphical simulation and computer-based animation based on such simulation. Particular embodiments provide methods and systems for computer-based graphical simulation of the surface of a character, including skin and clothing and computer-based animation based on such simulation.

BACKGROUND

Using computers for physics-based graphical simulation (which may be used, for example, for computer-aided animation) allows users to reduce the time and resources required by traditional animation while providing realistic graphical simulations. However, using computers for physics-based graphical simulation has a number of limitations. For example, simulation of realistic deformations of a surface (e.g. skin and/or clothing) of a character typically requires impractical amounts of computing power and time, making it impossible to use in real-time settings (e.g. where it may be desirable to generate simulated animation frames at frame rates of 12 fps, 15 fps, 24 fps or more).

Real-time friendly alternatives to physics-based simulations exist, but there is a trade-off between the quality of a simulated surface deformation and the performance of a corresponding CG character. For example, the commonly employed surface deformation method known as "linear blend skinning" can result in so-called "candy-wrapper" artefacts, where the volume of a portion of the CG character is undesirably reduced in an unrealistic manner.

There is a general desire to simulate realistic deformation of the surface(s) of CG characters including, for example, deformations, such as bending, bulging, and/or stretching without requiring excessive computational resources and with minimal subjective human intervention.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a method for preparing training data for training a neural network to simulate deformations of a surface of a CG character. The method comprises: obtaining a distribution of joint angles and/or bone positions of a CG character over a set of animation data comprising a plurality of frames; randomly generating a plurality of random poses according to the distribution of joint angles and/or bone positions; generating a high-fidelity deformation of the surface of the CG character for each of the plurality of random poses; transforming each of the high-fidelity deformations from a respective pose coordinate system to a rest pose coordinate system to obtain a plurality of warped rest poses, each warped rest pose corresponding to one of the high-fidelity deformations and one of the random poses and each warped rest pose parameterized at least in part by a three-dimensional (3D) surface mesh comprising a plurality of vertices; determining an approximation weight for each vertex of each of the plurality of warped rest poses; decomposing the plurality of warped rest poses to obtain: a decomposition neutral vector, a set of decomposition basis (blendshape) vectors and, for each warped rest pose, a set of decomposition weights; wherein, for each warped rest pose, the corresponding set of decomposition weights together with the decomposition neutral vector and the set of decomposition basis (blendshape) vectors can be used to at least approximately reconstruct the warped rest pose; wherein decomposing the plurality of warped rest poses is based at least in part on the approximation weights; and determining the training data to comprise the plurality of random poses and, for each random pose, the corresponding set of decomposition weights.

Determining the approximation weight for each vertex of each of the plurality of warped rest poses may comprise, for each vertex of each of the plurality of warped rest poses, determining a derivative of a position of the vertex in the warped rest pose with respect to a position of the vertex in the corresponding high-fidelity deformation.

The approximation weight for each vertex of each of the plurality of warped rest poses may be inversely proportional to the determined derivative of the position of the vertex in the warped rest pose with respect to a position of the vertex in the corresponding high-fidelity deformation.

Decomposing the plurality of warped rest poses may comprise determining a basis size (e.g. a number of decomposition basis (blendshape) vectors).

Determining the basis size may comprise performing one or more principal component analysis (PCA) decompositions over the plurality of warped rest poses and determining the basis size based on the one or more PCA decompositions.

Decomposing the plurality of warped rest poses may comprise performing a weighted low rank approximation (WLRA) decomposition based on the plurality of warped rest poses and the approximation weights.

The method may comprise parsing the warped rest poses into a plurality of regions to obtain, for each warped rest pose, a corresponding plurality of warped rest regions, each warped rest region parameterized at least in part by a regional three-dimensional (3D) surface mesh comprising a regional plurality of vertices.

Decomposing the plurality of warped rest poses may comprise determining, for each region, a regional decomposition neutral vector, a regional set of decomposition basis (blendshape) vectors and, for each warped rest region, a regional set of decomposition weights.

At least some of the warped rest regions may share at least some vertices from among their respective regional pluralities of vertices.

Parsing the warped rest poses into the plurality of regions may comprise assigning per-region weights to vertices that are shared between warped rest regions.

Each random pose may be parameterized at least in part by a number of bones (num_bones) and, for each bone, a set of bone matrix components. The num-bones sets of of the random pose.

Parsing the warped rest poses into the plurality of regions may comprise: determining a correlation between each coordinate of each vertex of each warped rest pose and each bone matrix component over the plurality of warped rest poses; clustering the vertices into n clusters based at least in part on the determined correlations; dilating the n clusters to determine n warped rest regions, one warped rest region corresponding to each cluster, wherein the regional plurality of vertices for each warped rest region comprises the vertices in its corresponding cluster and one or more vertices from neighboring clusters; and assigning per-region weights to vertices that belong to more than one warped rest region.

Dilating the n clusters to determine n warped rest regions may comprise, for each warped rest region, determining the one or more vertices from neighboring clusters to be within a threshold distance metric from at least one of the vertices in the cluster corresponding to the warped rest region.

Assigning per-region weights to vertices that belong to more than one warped rest region may comprise, for each particular vertex belonging to more that one warped rest region, performing an averaging process of the per-region weights of other vertices within the threshold distance metric from the particular vertex.

Performing the averaging process may comprise performing a weighted averaging process, wherein weights for the weighted averaging process are determined at least in part on distance metrics of the other vertices relative to the particular vertex.

The animation data may comprise the joint angles and/or bone positions.

Obtaining the distribution of joint angles and/or bone positions of the CG character over the set of animation data may comprise: receiving the set of animation data of the CG character; and determining the distribution of joint angles and/or bone positions of the CG character in each frame of the set of animation data.

The distribution of joint angles and/or bone positions of the character in the animation may comprise (or be fit to) a multivariate Gaussian distribution of the joint angles and/or bone positions of the CG character over the plurality of frames of the set of animation data.

The joint angles and/or bone positions may be parameterized at least in part by a plurality of bones and, for each bone, a corresponding bone matrix.

Each random pose may be parameterized at least in part by a plurality of bones and, for each bone, a bone matrix comprising a set of bone matrix components, the plurality of sets of bone matrix components together characterizing the joint angles and/or bone position of the random pose.

Generating high-fidelity deformations of the surface of the character for each of the plurality of poses comprises employing a muscle-based graphical simulation.

Another aspect of the invention provides a method for preparing training data for training a neural network to simulate deformations of a surface of a CG character. The method comprises: obtaining a distribution of joint angles and/or bone positions of a CG character over a set of animation data comprising a plurality of frames; randomly generating a plurality of random poses according to the distribution of joint angles and/or bone positions; generating a high-fidelity deformation of the surface of the CG character for each of the plurality of random poses; transforming each of the high-fidelity deformations from a respective pose coordinate system to a rest pose coordinate system to obtain a plurality of warped rest poses, each warped rest pose corresponding to one of the high-fidelity deformations and one of the random poses and each warped rest pose parameterized at least in part by a three-dimensional (3D) surface mesh comprising a plurality of vertices; parsing the warped rest poses into a plurality of regions to obtain, for each warped rest pose, a corresponding plurality of warped rest regions, each warped rest region parameterized at least in part by a regional three-dimensional (3D) surface mesh comprising a regional plurality of vertices from among the plurality of vertices of the vertices of the warped rest pose; determining an approximation weight for each regional vertex of each of the plurality of warped rest regions; for each region: decomposing the warped rest region over the plurality of warped rest poses to obtain, for the region: a regional decomposition neutral vector, a regional set of decomposition basis (blendshape) vectors and, for each warped rest pose, a regional set of decomposition weights; wherein, for each warped rest pose, the corresponding regional set of decomposition weights together with the regional decomposition neutral vector and the regional set of decomposition basis (blendshape) vectors can be used to at least approximately reconstruct the warped rest region of the warped rest pose; wherein decomposing the warped rest region over the plurality of warped rest poses is based at least in part on the approximation weights; and determining the training data to comprise the plurality of random poses and, for each random pose and for each region, the corresponding set of decomposition weights.

Determining the approximation weight for each regional vertex of each of the plurality of warped rest regions may comprise, for each regional vertex of each of the plurality of warped rest regions, determining a derivative of a position of the regional vertex in the warped rest region with respect to a position of the vertex in the corresponding high-fidelity deformation.

The approximation weight for each regional vertex of each of the plurality of warped rest regions may be inversely proportional to the determined derivative of the position of the regional vertex in the warped rest region with respect to a position of the vertex in the corresponding high-fidelity deformation.

For each region, decomposing the warped rest region over the plurality of warped rest poses may comprise determining a regional basis size (e.g. a number of regional decomposition basis (blendshape) vectors in the set of regional decomposition basis (blendshape) vectors).

Determining the basis size may comprise performing one or more principal component analysis (PCA) decompositions of the warped rest region over the plurality of warped rest poses and determining the basis size based on the one or more PCA decompositions.

Decomposing the warped rest region over the plurality of warped rest poses may comprise performing a weighted low rank approximation (WLRA) decomposition based on the warped rest region over the plurality of warped rest poses and the approximation weights.

At least some of the warped rest regions may share at least some vertices from among their respective regional pluralities of vertices.

Parsing the warped rest poses into the plurality of regions may comprise assigning per-region weights to vertices that are shared between warped rest regions.

Each random pose may be parameterized at least in part by a number of bones (num bones) and, for each bone, a set of bone matrix components. The num-bones sets of of the random pose.

Parsing the warped rest poses into the plurality of regions may comprise: determining a correlation between each coordinate of each vertex of each warped rest pose and each bone matrix component over the plurality of warped rest poses; clustering the vertices into n clusters based at least in part on the determined correlations; dilating the n clusters to determine n warped rest regions, one warped rest region corresponding to each cluster, wherein the regional plurality of vertices for each warped rest region comprises the vertices in its corresponding cluster and one or more vertices from neighboring clusters; and assigning per-region weights to vertices that belong to more than one warped rest region.

Dilating the n clusters to determine n warped rest regions may comprise, for each warped rest region, determining the one or more vertices from neighboring clusters to be within a threshold distance metric from at least one of the vertices in the cluster corresponding to the warped rest region.

Assigning per-region weights to vertices that belong to more than one warped rest region may comprise, for each particular vertex belonging to more that one warped rest region, performing an averaging process of the per-region weights of other vertices within the threshold distance metric from the particular vertex.

Performing the averaging process may comprise performing a weighted averaging process, wherein weights for the weighted averaging process are determined at least in part on distance metrics of the other vertices relative to the particular vertex.

The animation data may comprise the joint angles and/or bone positions.

Obtaining the distribution of joint angles and/or bone positions of the CG character over the set of animation data may comprise: receiving the set of animation data of the CG character; and determining the distribution of joint angles and/or bone positions of the CG character in each frame of the set of animation data.

The distribution of joint angles and/or bone positions of the character in the animation may comprise a multivariate Gaussian distribution of the joint angles and/or bone positions of the CG character over the plurality of frames of the set of animation data.

The joint angles and/or bone positions may be parameterized at least in part by a plurality of bones and, for each bone, a corresponding bone matrix.

Each random pose may be parameterized at least in part by a plurality of bones and, for each bone, a bone matrix comprising a set of bone matrix components. The plurality of sets of bone matrix components together may characterize the joint angles and/or bone position of the random pose.

Generating high-fidelity deformations of the surface of the character for each of the plurality of poses may comprise employing a muscle-based graphical simulation.

Another aspect of the invention provides a method for training a neural network to simulate deformations of a surface of a CG character. The method comprises: (a) receiving training data comprising training poses and, for each training pose, a corresponding set of training blendshape weights; (b) employing an untrained or partially trained neural network comprising a plurality of trainable parameters to predict blendshape weights based on one of the plurality of training poses; (c) determining an error metric, the error metric based at least in part on the predicted blendshape weights and the set of training blendshape weights corresponding to the one of the plurality of training poses; (d) updating the trainable parameters of the neural network based at least in part on the error metric; (e) evaluating a loop exit criteria and: if the loop exit criteria is satisfied, proceeding to step (f); or if the loop exit criteria is not satisfied, repeating steps (b), (c), (d) and (e) using a different one of the plurality of training poses; and (f) parameterizing the trained neural network based at least in part on the updated trainable parameters after the last iteration of step (d).

The loop exit criteria may be based at least in part on the error metric determined in the last iteration of step (c).

The loop exit criteria may be based at least in part on a number of iterations of steps (b), (c), (d) and (e).

The method may comprise, after the loop exit criteria is satisfied but before parameterizing the trained neural network, pruning data elements (e.g. bone matrix components) from the training poses to remove at least some data elements from the training poses.

Pruning data elements (e.g. bone matrix components) from the training poses to remove at least some data elements from the training poses may comprise employing a variational dropout technique.

The training data may comprise, for each training pose, a plurality of sets of training blendshape weights, each set of blendshape weights corresponding to a region of the surface of the CG character. The method may comprise performing steps (b), (c), (d), (e) and (f) for each region to obtain a trained neural network for each region.

The method may comprise, for each region, after the loop exit criteria is satisfied but before parameterizing the trained neural network, pruning data elements (e.g. bone matrix components) from the training poses to remove at least some of the data elements from the training poses where such pruned data elements have relatively low impact on the region of the surface of the CG character when compared to other data elements of the training poses.

Pruning the data elements (e.g. bone matrix components) from training poses to remove at least some of the data elements from the training poses that have a relatively low impact on the region of the surface of the CG character when compared to other data elements of the training poses comprises employing a variational dropout technique.

The method may comprise, after pruning data elements from the training poses to remove at least some of the data elements from the training poses but before parameterizing the trained neural network, reconfiguring the neural network architecture, and performing steps (b), (c), (d), (e) and (f) using the reconfigured neural network architecture.

The training data may be obtained in whole or in part by of the methods described above or elsewhere herein.

Another aspect of the invention provides a method for training a neural network to simulate deformations of a surface of a CG character. The method comprises: (a) receiving training data comprising training poses and, for each training pose, a plurality of sets of training blendshape weights, each set of blendshape weights corresponding to a region of the surface of the CG character; and for each region: (b) employing an untrained or partially trained neural network comprising a plurality of trainable parameters to predict blendshape weights based on one of the plurality of training poses; (c) determining an error metric, the error metric based at least in part on the predicted blendshape weights and the set of training blendshape weights corresponding to the region and the one of the plurality of training poses; (d) updating the trainable parameters of the neural network based at least in part on the error metric; (e) evaluating a loop exit criteria and: if the loop exit criteria is satisfied, proceeding to step (f); or if the loop exit criteria is not satisfied, repeating steps (b), (c), (d) and (e) with a different one of the plurality of training poses; and (f) parameterizing the trained neural network based on at least in part on the updated trainable parameters after the last iteration of step (d).

The loop exit criteria may be based at least in part on the error metric determined in the last iteration of step (c).

The loop exit criteria may be based at least in part on a number of iterations of steps (b), (c), (d) and (e).

The method may comprise, after the loop exit criteria is satisfied but before parameterizing the trained neural network, pruning data elements (e.g. bone matrix components) from the training poses to remove at least some of the data elements of the training poses where such pruned data elements have a relatively low impact on the region of the surface of the CG character when compared to other data elements of the training poses.

Pruning the data elements (e.g. bone matrix components) from the training poses to remove at least some of the data elements from the training poses where such pruned data elements have a relatively low impact on the region of the surface of the CG character when compared to other data elements of the training poses comprises employing a variational dropout technique.

The method may comprise, after pruning the training poses to remove at least some of the data elements of the training poses but before parameterizing the trained neural network, reconfiguring the neural network architecture, and performing steps (b), (c), (d), (e) and (f) using the reconfigured neural network architecture.

The training data may be obtained by any of the methods described above or elsewhere herein.

Another aspect of the invention comprises a method for employing a neural network to simulate deformations of a surface of a CG character. The method comprises, for each pose from among one or more poses of the CG character: employing a first trained neural network to infer a set of first blendshape weights based on a first set of bone matrices corresponding to a first region of the pose; employing a second trained neural network to infer a set of second blendshape weights based on a second set of bone matrices corresponding to a second region of the pose; reconstructing a first deformation of a first region of the surface of the CG character in a rest pose coordinate system based at least in part on the set of first blendshape weights; reconstructing a second deformation of a second region of the surface of the CG character in the rest pose coordinate system based at least in part on the set of second blendshape weights; combining the first deformation and the second deformation to obtain a combined deformation of the surface of the CG character in the rest pose coordinate system; and transforming the combined deformation from the rest pose coordinate system to a first pose coordinate system corresponding to the pose to obtain a deformation of the surface of the CG character in the first pose coordinate system.

Transforming the combined deformation from the rest pose coordinate system to the first pose coordinate system to obtain a deformation of the surface of the character in the first pose coordinate system may comprise employing a linear blend-skinning technique.

The first deformation may be parameterized at least in part by first three-dimensional positions of a first plurality of vertices and the second deformation may be parameterized at least in part by second three-dimensional positions of a second plurality of vertices. Combining the first deformation and the second deformation to obtain a combined deformation of the surface of the CG character in the rest pose coordinate system may comprise: combining the first and second pluralities of vertices; and where a vertex belongs to both the first and second pluralities of vertices, performing a sum of the first and second three dimensional positions of the vertex.

Performing the sum of the first and second three-dimensional positions of the vertex may comprise performing a weighted sum of the first and second three-dimensional positions of the vertex where each of the first and second three-dimensional positions is weighted by a corresponding per-region weight.

The method may comprise allowing a user to manually adjust an animation rig to generate the first and second sets of bone matrices for each pose.

The first neural network may be trained according to any one of methods and/or using the methods for preparing training data described above or elsewhere herein.

The second neural network may be trained according to any one of methods and/or using the methods for preparing training data described above or elsewhere herein.

Another aspect of the invention provides a system for preparing training data for training a neural network to simulate deformations of a surface of a CG character. The system comprises a processor configured to perform any of the training data preparation methods described above or elsewhere herein.

Another aspect of the invention provides a system for training a neural network to simulate deformations of a surface of a CG character. The system comprising a processor configured to perform any of the training methods described above or elsewhere herein.

Another aspect of the invention provides a system for employing a neural network to simulate deformations of a surface of a CG character. The system comprising a processor configured to perform any of the deformation simulation methods described above or elsewhere herein.

Other aspect of the invention provide methods comprising any features, combinations of features and/or sub-combinations of features described herein or inferable therefrom.

Other aspects of the invention provide systems comprising any features, combinations of features and/or sub-combinations of features described herein or inferable therefrom.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Figure 1:
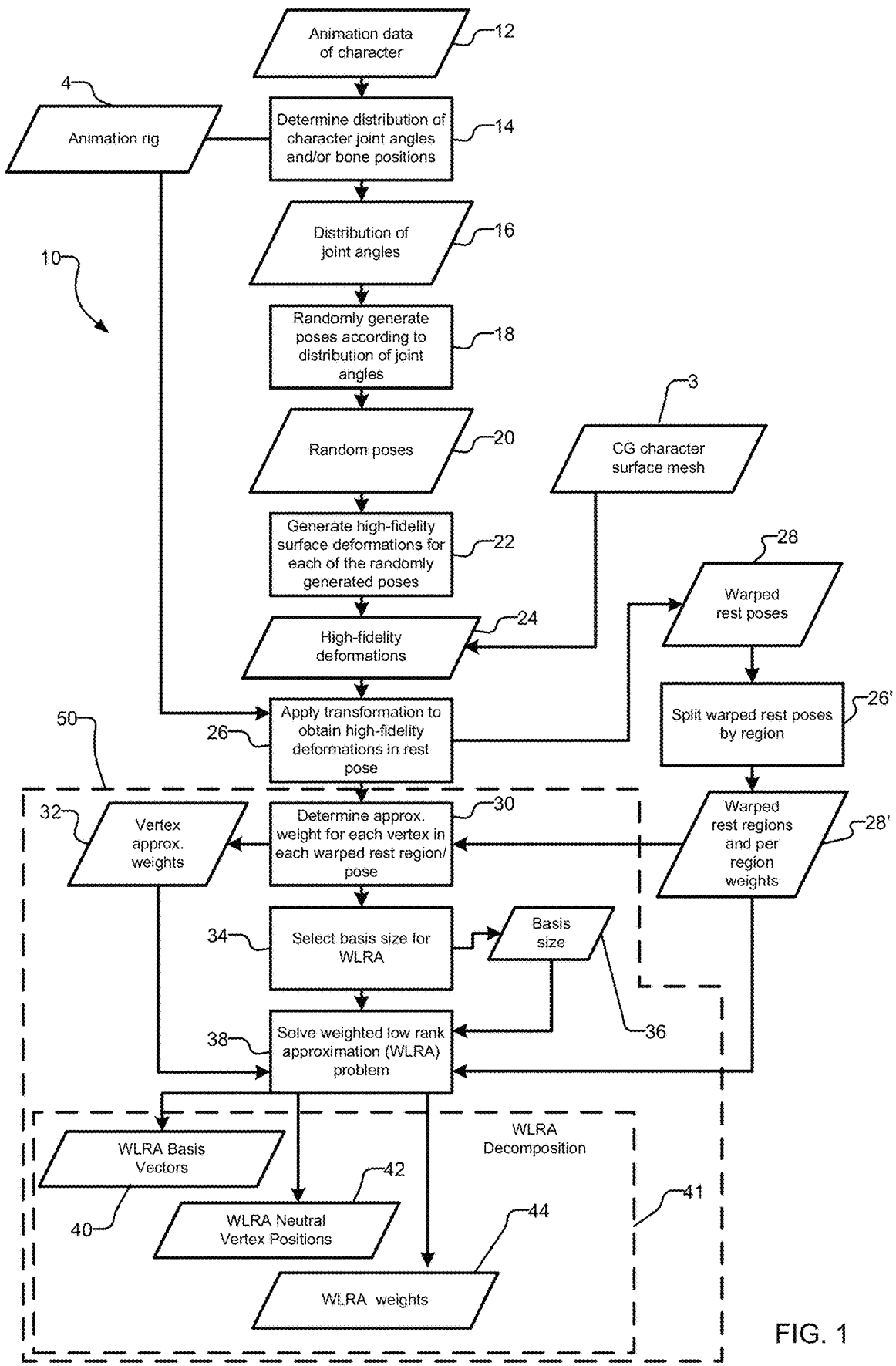
FIG. 1 depicts an exemplary method for preparing training data to train a neural network (or other form of artificial intelligence engine) to simulate realistic deformations of the surface of a CG character, according to one embodiment of the invention.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

One aspect of the invention provides a method for simulating the deformation of a surface (e.g. skin and/or clothing) of an animated CG character including, for example, subtle but visually significant deformations of the surface, such as deformations from bending, bulging, and stretching of the surface and corresponding animation of the CG character based on such simulation. The method is suitable for use in real-time applications (e.g. where it may be desirable to generate simulated animation frames at frame rates of 12 fps, 15 fps, 24 fps or more). The animated CG character may be a life-like human character, an animal character, a humanoid character, an invented character or otherwise. The CG character may or may not be wearing clothing.

A surface of a CG character may be defined by a 3D surface mesh comprising a plurality of interconnected vertices. Each vertex has a 3D position in space. The 3D position of each vertex in space may be described with respect to various coordinate systems (e.g. x, y and z-coordinates). In some cases, the position of each vertex in 3D space is described with respect to one or more bones of the character (described further herein). Since the bones of the CG character are not static, there may be a different coordinate system for each pose. To facilitate the methods described herein, a rest pose coordinate system may be employed in various ways. The rest pose coordinate system may comprise coordinates which are specified with reference to a rest pose of the CG character. Any pose could be employed as a rest pose. In some embodiments, the rest pose may be a "T-pose" with the arms out (such as the T-pose depicted in FIGS. 2, 3 and 4A), although this particular rest pose is not mandatory.

The surface of a character may be deformed by shifting the position of one or more of the vertices to represent creases, bends, bulges etc. As such, the deformation of the surface of a character may be represented by the change in position of one or more vertices that define the surface. This change in position of a vertex may be represented as a vector (e.g. (x, y, z)).

In some embodiments, the simulated deformation of the surface of the realistic CG character is based at least in part on a user's manipulation of an animation rig. In this way, as a user manipulates the animation rig of the CG character from a particular first position (or pose) into a particular subsequent position (or pose), the simulated surface of the character is deformed (e.g. from a first surface geometry or first surface configuration to a subsequent surface geometry or subsequent surface configuration) according to that particular manipulation.

An animation rig may comprise a computer-based representation of a three-dimensional CG character made up of a series of interconnected digital bones. For example, for graphical simulation of a life-like humanoid CG character, the animation rig could comprise interconnected digital bones corresponding to each of the bones of an adult human body or a subset of the bones of an adult human body. The animation rig may be moved into a pose by manipulating each digital bone directly or by manipulating handles (e.g. handle 5 depicted in FIG. 3), wherein each handle is attached to one or more (typically, a plurality of) corresponding bones and manipulating the handle causes each of the corresponding bone(s) to be moved.

Figure 2:
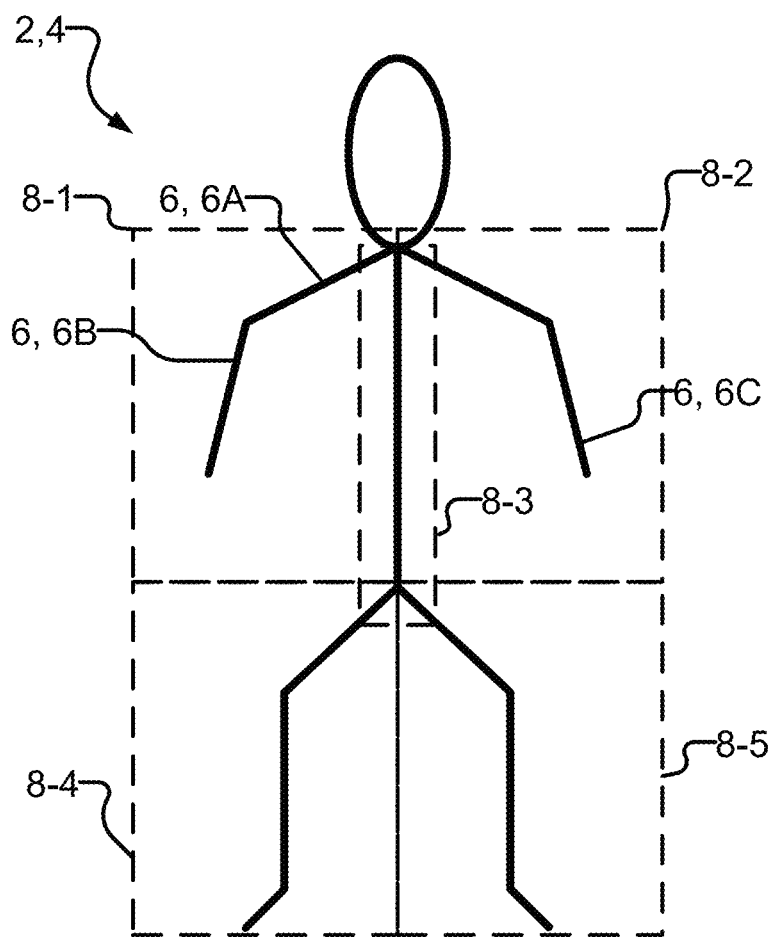
FIG. 2 is a schematic depiction of an animation rig according to an example embodiment of the invention.
Figure 3:
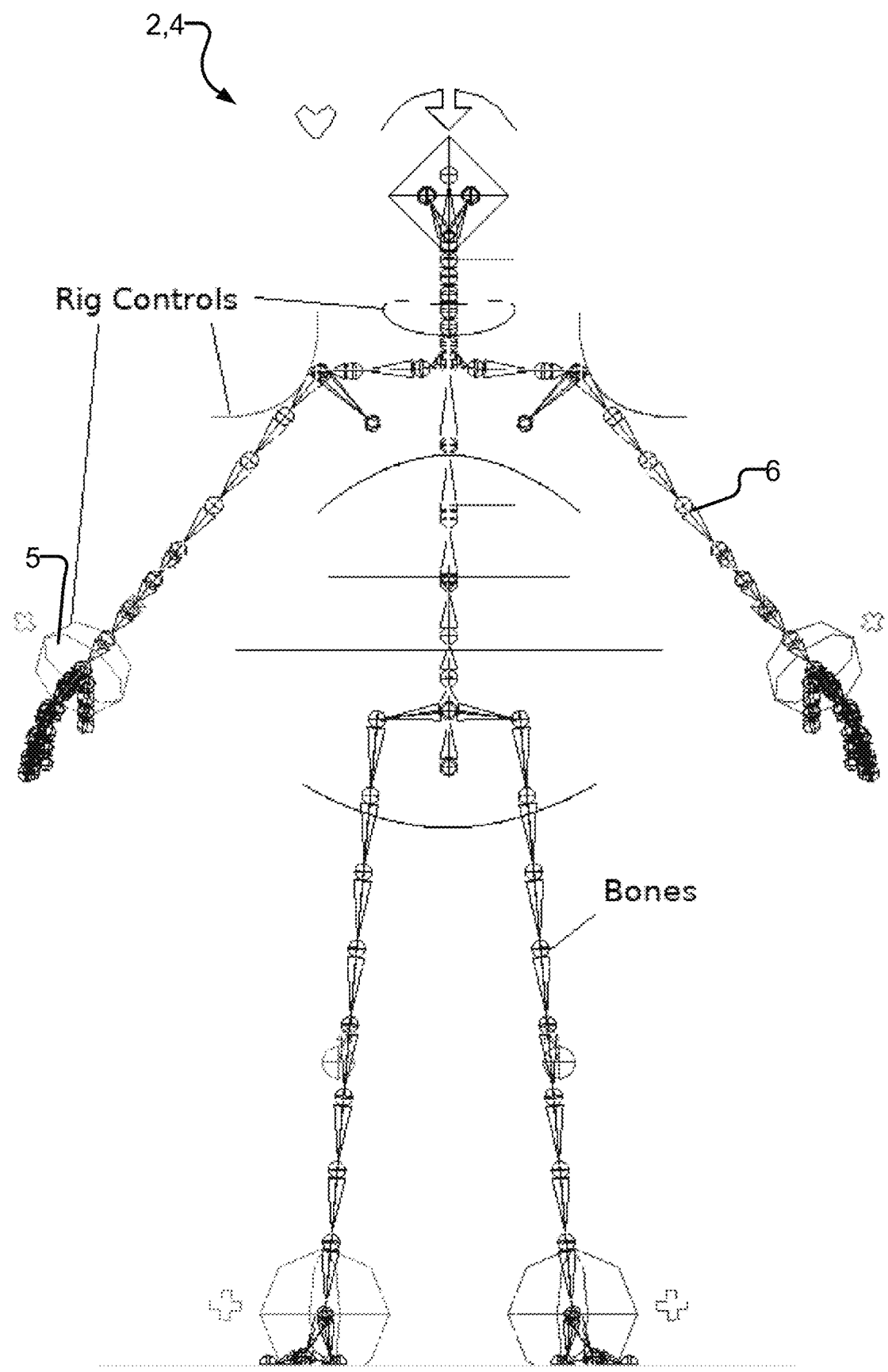
FIG. 3 depicts an exemplary animation rig according to an example embodiment of the invention.

FIG. 2 depicts an exemplary, non-limiting representation of an animation rig 4 (also referred to as rig 4) of a CG character 2. Rig 4 comprises interconnected digital bones 6. For ease of explanation, animation rig 4 of the FIG. 2 illustration only comprises digital bones 6 corresponding to a small subset of the bones of an adult human body. In practice, a typical rig 4 may comprise a greater number of digital bones 6, such as is shown in the example rig 4 of FIG. 3. While CG character 2 is depicted in FIGS. 2 and 3 as being human-like, this is not necessary.

Digital bones 6 are hierarchical in nature. For example, having regard to the FIG. 2 example rig 4, movement of digital bone 6A causes corresponding movement of digital bone 6B, much like movement of one's humerus causes movement of one's radius and ulna. However, some bones 6 that are lower in the hierarchical structure may be moved without moving bones that are higher in the hierarchical structure. For example, digital bone 6B can be moved without moving digital bone 6A.

In some embodiments, the simulated surface of the CG character 2 is deformed based on data that represents a pose (e.g. bone configuration) of animation rig 4. That data may be in the form of a plurality of matrices (each referred to herein as a "bone matrix"). Each digital bone 6 of a rig 4 may have a corresponding bone matrix. A bone matrix for a particular digital bone 6 may define a transformation (e.g. translation, rotation and scale) which defines a relative location (e.g. relative to the location of any digital bones 6 that are higher in the hierarchy of animation rig 4) of that digital bone 6. For example, while the relative location of digital bone 6B is described by its own bone matrix, both the bone matrix for digital bone 6A and the bone matrix for digital bone 6B would be employed to describe the global position (e.g. non-relative position) of digital bone 6B.

In some embodiments, each bone matrix may comprise a three-by-four matrix wherein a first column defines a local x-axis, a second column defines a local y-axis, a third column defines a local z-axis and a fourth column represents the origin (e.g. typically an (x,y,z) coordinate origin). In some embodiments, each bone matrix may comprise a four-by-four matrix, where the additional bottom row may have the values [0,0,0,1] and may be employed for perspective transformations and/or forming the bone matrix invertible.

The bone matrices of each digital bone 6 of animation rig 4 may represent the position of animation rig 4 for a single pose or a corresponding single frame of animation. For a moving graphical simulation or a corresponding animation, multiple bone matrices for each digital bone 6 (each corresponding to one frame) may be used to represent the position of animation rig 4 for multiple corresponding animation frames.

For simplicity, some of the methods herein may be described in relation to a single frame of graphical simulation or a corresponding animation, but it should be understood that multiple instances of such methods can be employed sequentially or in parallel to graphically simulate multiple frames of animation.

In some embodiments, the methods described herein for simulating deformations of the surface (e.g., skin and/or clothing) of a CG character employ a neural network ("NN") or some other form of artificial intelligence engine ("AIE"). In the description that follows, the methods are described as using a NN without loss of generality that some other form of AIE could be used in addition to or in the alternative to the NN. One aspect of the invention provides a method for preparing training data for training such a NN.

FIG. 1 depicts an exemplary, non-limiting method 10 for preparing training data for a NN employable for graphically simulating deformation of the surface 3 (e.g. skin and/or clothing) of a CG character 2 according to a particular embodiment.

Method 10 starts at step 14. At step 14, method 10 receives animation data 12 for character 2. Animation data 12 may be provided in the form of control parameters for an animation rig 4, joint angle parameters, bone position parameters, bone matrices and/or the like. Animation data 12 may be provided for each of a plurality of frames representing movement of character 2. For example, animation data 12 may be provided for 100, 1,000, 10,000 or more frames, with animation data 12 for each frame specifying a corresponding pose of character 2. Animation data 12 may be chosen to depict movements of character 2 that are representative of the desired range of motion of character 2. Animation data 12 may be purposefully made for method 10 or may have been made for other purposes and can be re-used for method 10. Animation data 12 may originate from any of a variety of suitable sources, including, for example, motion capture, hand-authored animation, posing a rig 4 to match images in a manual or automated fashion.

At step 14, animation data 12 is processed to fit a probability distribution 16 to the different joint angles, bone positions and/or bone matrices of character 2 present in animation data 12. In some embodiments, the distribution 16 of joint angles and/or bone positions determined at step 14 may be a multivariate Gaussian distribution.

At step 18, a plurality of random training poses 20 of character 2 are generated according to distribution 16. The number of random training poses 20 generated at step 18 may be denoted herein as f. Different combinations of random joint angles and/or bone positions (e.g. angles between adjacent digital bones 6 of rig 4) generated according to distribution 16 may be combined to create random training poses 20. The randomized joint angles and/or bone positions used to obtain ransom training poses 20 may be generated using any suitable technique for generating random or pseudo-random numbers according to a probability distribution. By limiting the random training poses 20 of character 2 according to distribution 16, method 10 prevents or reduces the generation of unrealistic poses at step 18 that are not representative of desirable poses of character 2. This technique for mitigating unrealistic poses may improve the efficiency of training a subsequent neural network and may improve the quality of the deformations generated by a subsequently trained neural network.

At step 22, a high-fidelity deformation 24 of surface 3 of character 2 is generated for each of random training poses 20. Each high-fidelity deformation 24 includes the creases, bulges, stretches, etc. of surface 3 of character 2 that would occur to surface 3 of character 2 if character 2 was positioned in the corresponding pose. In some embodiments, high-fidelity deformations 24 may be computer generated using a known technique, such as a muscle-based graphical simulation technique. Techniques used to generate high-fidelity deformations 24 may include techniques that are relatively computationally expensive. By limiting the use of such a computationally-expensive technique to step 22 of method 10 for preparing training data, the methods described herein may reduce the computational expense of inferring high quality simulated deformations of surface 3 of character 2 when it comes to method for inferring high quality simulated deformations of surface 3 using a trained NN. Moreover, the methods described herein may be used to infer real-time deformations (e.g. for live performances, real-time editing and/or video game animation) using a trained NN.

Prior to step 26, each high-fidelity deformation 24 comprises a representation of the deformations of surface 3 (e.g. creases, stretching, bulging, etc.) of character 2 in a coordinate system of a corresponding random training pose 20 (e.g. where the positions of the vertices of surface 3 in each high-fidelity deformation 24 are defined with reference to the rig 4 in a corresponding random training pose 20 of character 2) and not in the rest pose coordinate system (e.g. where the position of the vertices of surface 3 are defined in relation to rig 4 in the rest pose of character 2).

Figures 4A, 4B, 4C:
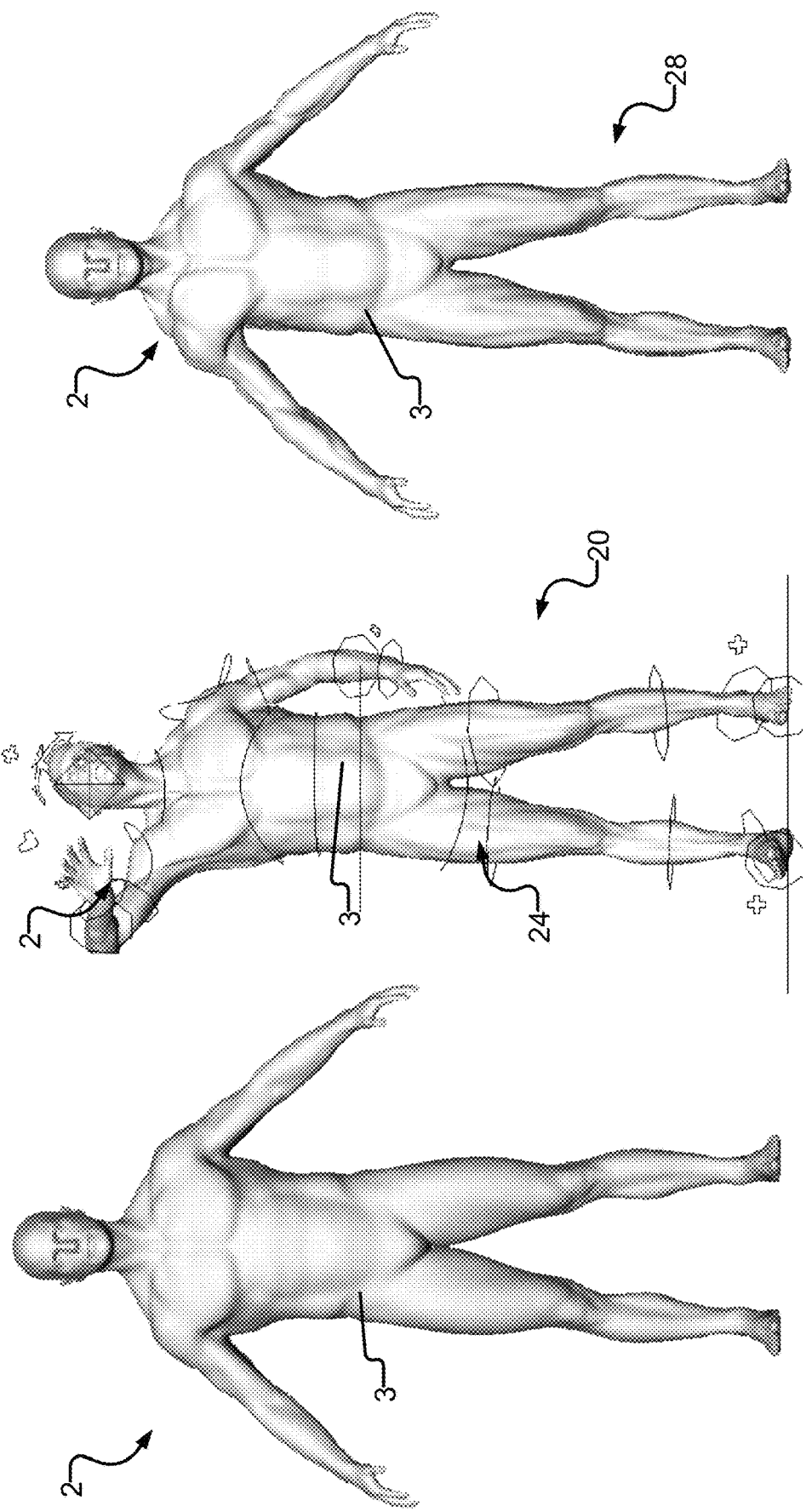
FIG. 4A depicts an exemplary character in a rest pose according to one embodiment of the invention.
FIG. 4B depicts a high-fidelity deformation of the character of FIG. 4A in an exemplary random training pose according to one embodiment of the invention.
FIG. 4C depicts a warped rest pose corresponding to the exemplary random training pose of FIG. 4B.

At step 26, a transformation is applied to each high-fidelity deformation 24 to convert each high-fidelity deformation 24 from its corresponding random training pose coordinate system to the rest pose coordinate system. Step 26 outputs a plurality of warped rest poses 28, one for each random training pose 20. Each warped rest pose 28 maintains the deformations to surface 3 corresponding to the random training pose 20, but defines the deformations with respect to the rest pose coordinate system. FIG. 4B depicts a high-fidelity deformation 24 of character 2 in an exemplary random training pose 20, while FIG. 4C depicts a warped rest pose 28 corresponding to the exemplary random training pose 20 of FIG. 4B. The deformations of surface 3 can be seen by comparing warped rest pose 28 of FIG. 4C to the rest pose of character 2 depicted in FIG. 4A.

In some embodiments, step 26 employs a reverse linear blend skinning technique. In linear blend skinning, blended matrices are employed to transform the position of each vertex. At step 26, the inverse of each blended matrix may be obtained and each vertex of surface 3 may then be transformed by its corresponding inverse blended matrix. For example, for each vertex of surface 3, the inputs (e.g. joint angles, bone positions and/or bone matrices) that can influence the deformation of that vertex are determined. These inputs may be provided in, or converted to, the form of bone matrices. Each input may be assigned a weight representative of its effect on the deformation of that vertex. In some embodiments, this weight assignment may be manually performed by a user. In some embodiments, this weight assignment may additionally or alternatively be automated in whole or in part. These inputs are blended based at least in part on the weights to obtain a blended matrix. The inverse of the blended matrix is determined and employed to transform the position of the vertex from the random training pose coordinate system to the rest pose coordinate system.

Figure 5:
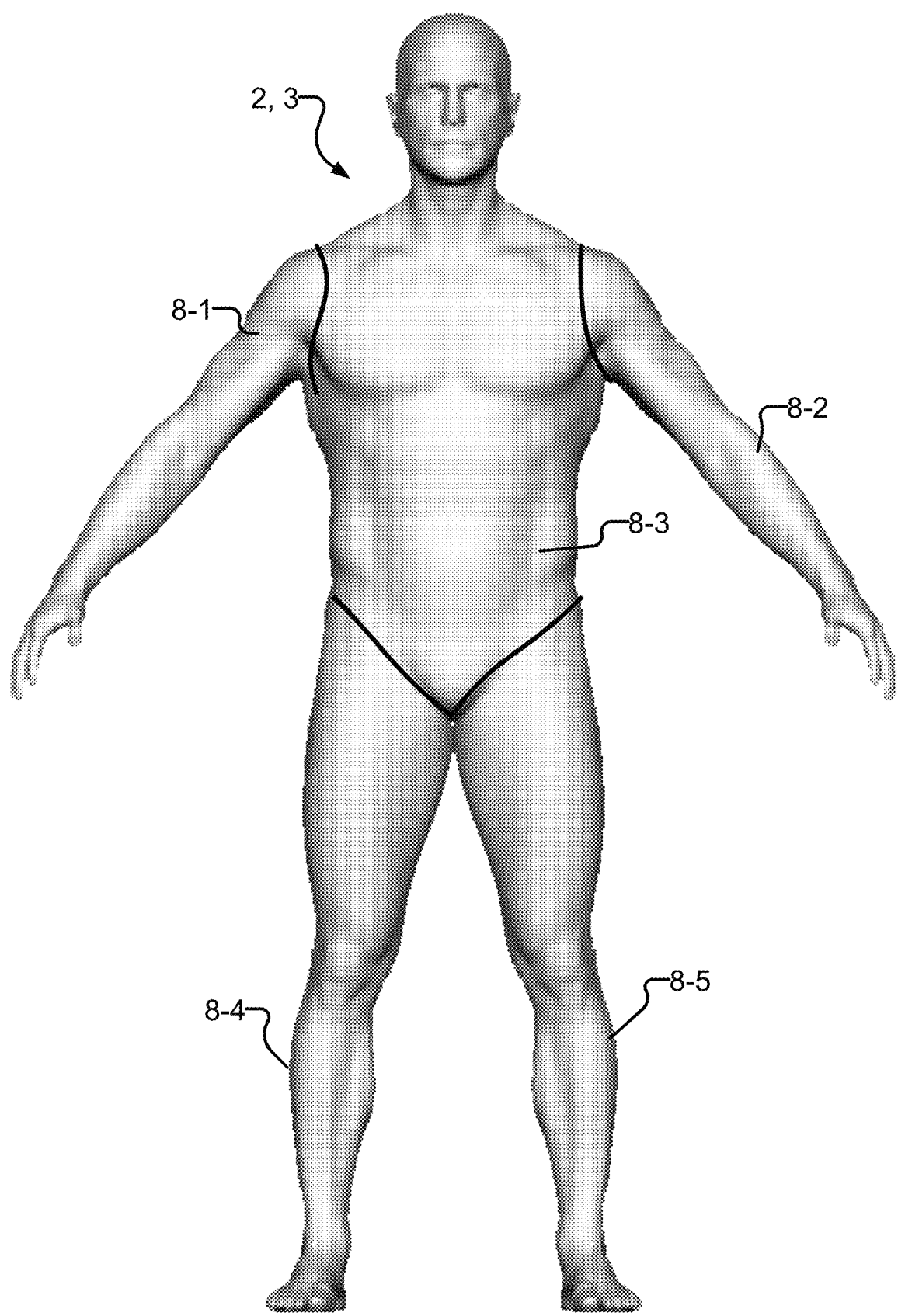
FIG. 5 depicts a simulation of the surface of a character in a rest pose divided into a plurality of regions according to one embodiment of the invention.

In some embodiments, surface 3 is organized into n regions 8 where n is an integer greater than zero. For example, surface 3 of character 2 of the illustrated FIG. 5 example is organized into five (i.e. n=5) regions 8-1, 8-2, 8-3, 8-4, 8-5 (collectively referred to herein as regions 8). In some embodiments, regions 8 may overlap (e.g. a joint or bone may be part of first region 8-1 and second region 8-2). In other embodiments, regions 8 are discrete. Each region 8 may correspond to a portion of animation rig 4, as illustrated in FIG. 2. Each region 8 may be defined to include a group of digital bones 6 that, when moved, can affect a portion (e.g. a corresponding set of vertices) of the surface 3 of the character 2 in that region 8. For example, first region 8-1 includes a first bone 6A corresponding to the humerus bone and a second bone 6B corresponding to the ulna and/or radius bone. Movement of the first bone 6A and/or second bone 6B may affect a corresponding portion of surface 3 of character 2 (e.g. a set of vertices of surface 3 corresponding to first region 8-1). In contrast, first region 8-1 does not include third bone 6C, movement of which would not affect the vertices of surface 3 of character 2 within first region 8-1. It should be understood that each surface 3 could be organized into many combinations of n regions, and that FIG. 2 is merely a simplified example for illustrative purposes.

In some embodiments, the number, n, of regions 8 and/or the arrangement of regions 8 is determined by a user. Increasing the number, n, of regions 8 may improve the computational efficiency of method 10 and the quality of the resultant trained neural network as discussed further herein. On the other hand, if surface 3 is organized into too many regions 8, the simulated surface of the character 2 may become disjointed.

In some embodiments, at step 26', the data of each warped rest pose 28 is separated by region 8 into warped rest regions 28'. Each warped rest region 28' includes the high-fidelity deformations (vertex positions) of surface 3 in a region 8 for a random training pose 20 in the rest pose coordinate system. As some regions 8 may overlap, some warped rest regions 28' may overlap—e.g. some vertices of surface 3 may be present in multiple warped rest regions 28'. The output of step 26' is a plurality of warped rest regions 28', which comprises one warped rest region 28' for each of the n step 26' regions 8 and for each of the f random training poses 20 (i.e. n warped rest regions 28' for each of the f random training poses 20). Each warped rest region 28' may be represented by a vector of dimension 3 k, where k is the number of vertices in the region 8 and the 3 k is representative of 3 coordinates (e.g. (x, y, z) for each vertex. The number k of vertices may be different for different regions 8. The output of step 26' may be described as a set of f warped rest regions 28' (one per training pose 20) for each of the n regions. Step 26' is not mandatory; however, for the sake of brevity and without loss of generality, the following steps of method 10 are described herein as though step 26' has occurred.

In currently preferred embodiments, some vertices of surface 3 belong to multiple regions 8 and may be assigned per-region weights. In some embodiment, the per-region weights for a given vertex of surface 3 are in a range of [0,1] and may be represented as a vector of dimension n. In some embodiments, the sum of these per-vertex weights is normalized to unity. These per-region weights may also be output from block 26'.

Figure 1A:
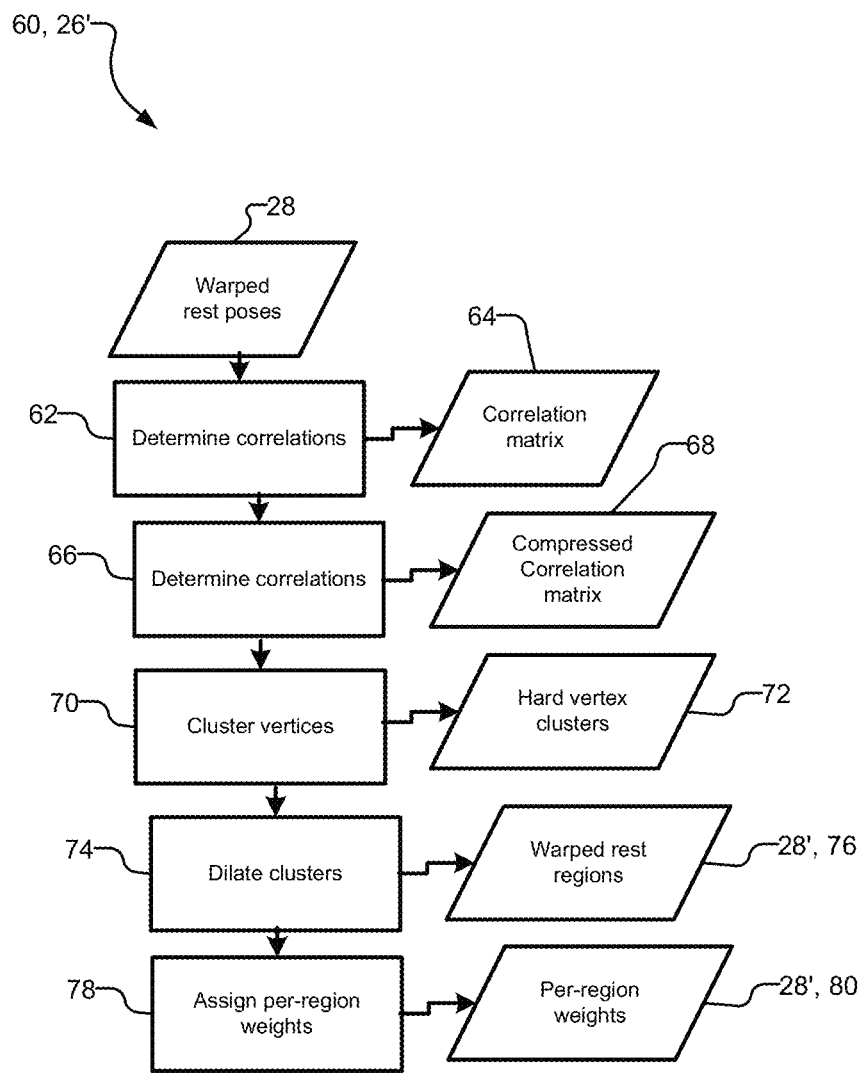
FIG. 1A depicts a method for parsing bones and corresponding CG character surface vertices into regions according to a particular embodiment.

As discussed above, regions 8 and the vertices that belong to each region 8 may be determined by a user (e.g. an artist). Similarly, the artist may assign per-region weights to vertices that belong to multiple regions 8. In some embodiments, the block 26' division of warped rest poses 28 into regions 8 may be automated in whole or in part. FIG. 1A depicts a method 60 for parsing warped rest poses 28 into regions 8 according to a particular example embodiment. Method 60 may be used to perform the procedures of block 26' of method 10. Method 60 starts in block 62 which involves determining a statistical relationship 64 between the components of bone matrices (i.e. the bone matrices which may be used to specify warped rest poses 28 and/or random poses 20) and the coordinates of each vertex across all of warped rest poses 28 and/or random poses 20. In some embodiments, this block 62 statistical relationship 64 is a correlation or correlation coefficient between each bone matrix component and each coordinate of each vertex across all of warped rest poses 28. In some particular embodiments, this block 62 statistical relationship 64 comprises a Pierson correlation coefficient between each bone matrix component and each coordinate of each vertex across all of warped rest poses 28. This block 62 statistical relationship 64 may take the form of a correlation matrix 64 which has 3 rows per vertex and a number of columns equal to the number of components (e.g. 12) in each bone matrix multiplied by the number of bones (num bones).

Method 60 then proceeds to block 66 which involves compressing correlation matrix 64 to provide compressed correlation matrix 68. In one particular embodiment, block 66 comprises taking the square of each element of correlation matrix 64 and adding up blocks of squared matrix elements that correspond to a particular vertex. For example, in the example discussed above (where each bone matrix comprises 12 components), then a block of correlation matrix corresponding to a particular vertex may comprise its 3 rows (e.g. corresponding (x,y,z) coordinates) and 12 columns (corresponding to the components of a particular bone). The result of such a compression technique is a compressed correlation matrix that has one row per vertex and one column per bone. It will be appreciated that if an element of compressed correlation matrix 68 is high, then the position of the bone is highly relevant to the position of the corresponding surface vertex and if an element of compressed correlation matrix 68 is low, then the vertex moves independently of the corresponding bone. It will be appreciated from the above, that in compressed correlation matrix 68, each vertex is associated with a vector of dimension num bones (corresponding to a row of compressed correlation matrix 68) which may be thought of as a position of the vertex in a num bones dimensional space.

Method 60 then proceeds to block 70 which involves performing a clustering operation on the vertices according to the positions of the vertices in the num bones dimensional space to obtain hard vertex clusters 72. The block 70 clustering operation has the effect of dividing the vertices (rows) of compressed correlation matrix into a number n of hard clusters 72 so that vertices affected by the same set of bones end up in the same cluster. The number n of hard clusters 72 may correspond to the number of desired regions 8 and may be a parameter of the block 70 clustering operation. In some embodiments, the block 70 clustering operation comprises a K-means clustering routine, a Gaussian mixture models clustering routine and/or the like. The hard vertex clusters 72 output from the block 70 clustering operation may have little or no overlap of vertices between clusters 72. As discussed above, it can be desirable to have some vertices that belong to more than one region.

Consequently, method 60 then proceeds to block 74 which involves dilating each of the hard vertex clusters 72 by, for each vertex (each row of compressed correlation matrix 68) in particular one of hard vertex clusters 72, identifying vertices within a threshold distance of the vertex in the num bones dimensional space and adding any such vertices to the original cluster to obtain a set of n regions (warped rest regions 76) which correspond generally to clusters 72 but which have an additional number of vertices that also belong to other warped rest regions 76. Warped rest regions 76 may corresponding to warped rest regions 28' in FIG. 1.

Method 60 then proceeds to block 78 which involves determining per-region weights 80 for each vertex. Per-region weights 80 of method 60 may correspond to per-region weights 26' of method 10 (FIG. 1). As discussed above, in some embodiments, the per-region weights 80 for a given vertex are in a range of [0,1] and may be represented as a vector of dimension n. In some embodiments, the sum of these per-vertex weights 80 is normalized to unity. In some embodiments, the weights of for a particular vertex may be determined by taking an average of the per-region weights of neighboring vertices (i.e. the vertices within a threshold distance of the vertex in the num bones dimensional space determined in block 74). In some embodiments, this block 78 averaging process to determine the per-region weights of a particular vertex may be a weighted averaging process where the weights of the neighboring vertices in the averaging process are determined based on (e.g. inversely proportional to) distances between the neighboring vertices and the particular vertex under consideration. It will be appreciated that the per-region weights 80 output from may provide, for each vertex, a vector of dimension n where each element of the vector is in a range of [0,1].

Returning to FIG. 1, method 10 then proceeds to block 50 (shown in dashed lines in FIG. 1). Block 50 involves a number of steps (e.g. steps 30, 34 and 38) which, in the illustrated embodiment, are performed once for each of the n step 26' regions 8. That is, block 50 is performed n times (once for each step 26' region 8). Each iteration of block 50 is performed on a set of f warped rest regions 28' (corresponding to a particular one of the n step 26' regions 8) across the set f of random training poses 20. As discussed above, step 18 generates f random training poses 20 and each warped rest region 28' comprises a set of warped vertex positions for a corresponding one of the n regions for a corresponding one of the f random training poses 20. Each iteration of block 50 generates a corresponding WLRA decomposition 41, as described in more detail below.

Block 50 begins at step 30, where each warped rest region 28' for the current region 8 is analyzed to identify spurious vertices. For example, when a vertex of a high-fidelity deformation 24 is transformed from a random training pose coordinate system to the rest pose coordinate system, the transformation may return undesirable results if, for example, the transformation matrix is singular or close to singular.

Spurious vertices can be identified by taking the derivative of the position of each vertex in the warped rest region 28' with respect to the position of the same vertex in the corresponding high-fidelity deformation 24 and comparing this derivative to a suitable (e.g. user-configurable) threshold. In some embodiments, if the derivative is above the threshold, the corresponding vertex is determined to be spurious and can be ignored in the remainder of the current iteration of block 50. In some embodiments, in addition to or in the alternative to eliminating vertices using a thresholding process, each vertex may attributed a vertex approximation weight 32, wherein a magnitude of the approximation weight 32 for a particular vertex is based at least in part on (e.g. inversely proportional to) the derivative of the position of the vertex in the warped rest region 28' with respect to the position of the same vertex in the corresponding high-fidelity deformation 24.

If all vertex approximation weights 32 are equal (e.g. because there were no spurious vertices after step 26) or if the spurious vertices are not identified and accounted for (e.g. because step 30 is skipped), principal component analysis (PCA) or other suitable matrix dimensionality reduction or matrix decomposition technique could be employed to reduce warped rest regions 28' to a plurality of "blendshapes" (also knows as PCA basis vectors or just basis vectors). However, given that spurious vertices are likely to occur at step 26 and it is undesirable not to identify and account for spurious vertices, since such spurious vertices tend to reduce the fidelity of the simulations subsequently produced using the trained NN, method 10 may instead incorporate a weighted low rank approximation ("WLRA") process which decomposes warped rest regions 28' into WLRA decompositions 41 which incorporates per-vertex approximation weights 32 into the decomposition process. As explained in more detail below, each iteration of block 50 may decompose a set of f warped rest regions 28' into a WLRA decomposition 41 comprising: a plurality of WLRA "blendshapes" (or WLRA basis vectors) 40 and a set of WLRA neutral vertex positions 42 which are common to the set of f warped rest regions 28'; and, for each warped rest region 28', a corresponding set of WLRA reconstructions weights 44.

At step 34, a basis size 36 for the WLRA decomposition is selected or otherwise determined. Basis size 36 represents the number of WLRA blendshapes (WLRA basis vectors) to be resolved by employing WLRA at step 38. Basis size 36 may be selected or otherwise determined based on the number of random training poses 20 generated at step 18. Basis size 36 may be selected or otherwise determined based on the width of distribution 16. In some embodiments, basis size 36 is chosen by a user based on experience or through trial and error. In some embodiments, PCA decomposition is employed on the set of f warped rest regions 28' corresponding to the current iteration of block 50 to determine basis size 36. For example, by setting all vertex approximation weights 32 to be equal, PCA decomposition may be employed to determine basis size 36 within a user-specified tolerance (e.g. the PCA decomposition may be set to be able to faithfully reproduce some threshold amount of the input set of warped rest regions 28'). The resultant basis size of the PCA decomposition may be used as the WLRA basis size 36. Alternatively, the resultant basis size of the PCA decomposition may be used as a starting point to determine starting point for WLRA basis size 36 and then WLRA basis size 36 can be reduced by one dimension at a time while ensuring that the resultant WLRA basis vectors 40 and reconstruction weights 44 provide results that are within acceptable parameters. Using PCA decomposition to choose WLRA basis size 36 may reduce computational expense at step 34 as compared to using WLRA to determine WLRA basis size 36.

At step 38, the WLRA problem is solved for the current set of f warped rest regions 28'. The WLRA problem receives as input, a set of f warped rest regions 28', per-vertex approximation weights 32 for each of the f warped rest regions 28' and WLRA basis size 36. Because there are per-vertex approximation weights 32 for each of the f warped rest regions 28' and because the f warped rest regions 28' can be considered to be frames, approximation weights 32 may be referred to herein as per-vertex per-frame approximation weights 32. The WLRA problem may be solved according to any suitable technique, including by way of non-limiting example, the method described by N. Srebro et al., Weighted Low-Rank Approximations, *Proceedings of the Twentieth International Conference on Machine Learning* (ICML-2003), Washington DC, 2003, which is hereby incorporated herein by reference. The WLRA decomposition problem of step 38 outputs: a number, m, of WLRA basis vectors (also referred to herein as WLRA blendshapes) 40 (where each WLRA basis vector may have a dimension of 3 k where k is a number of vertices in the current warped rest region 28' and where the number m of WLRA basis vectors 40 is equal to WLRA basis size 36); a set of neutral vertex positions 42 (which may take the form of a vector of dimension 3k); and, for each warped rest region 28', a corresponding set of m WLRA reconstruction weights 44 (which may take the form of a vector of dimension m). The m WLRA basis vectors 40 and neutral vertex positions 42 output from step 38 may be common across the f warped rest regions 28' processed in the current iteration of block 50 and there may be a vector of m WLRA reconstruction weights 44 for each of the f warped rest regions 28' of the current iteration of block 50. Together, WLRA basis vectors 40, neutral vertex positions 42 and WLRA weights 44 may be referred to herein as a WLRA decomposition 41.

Each of the f warped rest regions 28' associated with an iteration of block 50 may be approximately represented (or approximately reconstructed) by a weighted combination of WLRA blendshapes 40. Because of the per-vertex per-frame approximation weights 32 incorporated into the block 38 WLRA decomposition, for each warped rest region 28', vertices having higher weights 32 may be more faithfully reconstructed (after decomposition according to the step 38 WLRA process) when compared to vertices having relatively low approximation weights 32. Each warped rest region 28' may be reconstructed by: determining the product of its corresponding set (vector) of m WLRA reconstruction weights 44 and a WLRA basis matrix of dimension [m, 3 k], whose rows each comprise one of the WLRA basis vectors 40 and adding this product on a vertex-by vertex basis to the vector of 3 k neutral vertex positions 42 to obtain the vertex positions of the reconstructed warped rest region 28'.

For example, as discussed above, the number of warped rest regions 28' (corresponding to the number of training poses 20) input to the step 38 WLRA process is f and each warped rest region 28' comprises k vertices (with 3 coordinates (e.g. (x,y,z) for each vertex), then the entire set of warped rest regions 28' in a particular iteration of block 50 and a particular instance of the step 38 WLRA decomposition may be represented by a matrix X of dimension [f,3 k], where each row of X represents one warped rest region 28'. The block 38 WLRA problem outputs a WLRA decomposition 42 comprising: a WLRA basis matrix V having dimensionality [m,3 k], where each row of WLRA basis matrix V is a WLRA blendshape (basis vector) 40, a WLRA weight matrix Z having dimensionality [fm], where each row of WLRA weight matrix Z comprises a set of m WLRA weights 44 for a particular warped rest region 28'; and a set of neutral vertex positions 42 (which may take the form of a vector $\vec{\mu}$ of dimension 3 k). Then, the set of f input warped rest regions 28' can be at least approximately reconstructed according to according to $\hat{X}=ZV+\vec{\Omega}$, where $\hat{X}$ is a matrix of dimensionality [f,3 k] in which each row of $\hat{X}$ represents an approximate reconstruction of one warped rest region 28' in input matrix X and $\vec{\Omega}$ is a matrix of dimensionality [f,3 k], where each row of $\vec{\Omega}$ represents neutral vertex positions 42 (e.g. each row of is the neutral vertex position vector µ). An individual warped rest region 28' (e.g. a row of the warped rest region input matrix X) can be approximately constructed according to $\hat{x}=\vec{z}V+\vec{\mu}$, where $\hat{x}$ is the reconstructed warped rest region 28' comprising a vector of dimension 3 k, $\vec{z}$ is the set (vector) of WLRA weights 41 having dimension m selected as a row of WLRA weight matrix Z and $\vec{\mu}$ is a vector of dimensionality 3 k representing neutral vertex positions 42. In this manner, a vector $\vec{z}$ of WLRA weights 44 may be understood (together with the WLRA basis matrix V (made up of WLRA basis vectors 40) and the neutral vertex positions 42 (vector $\vec{\mu}$)) to represent a warped rest region 28'. It will be appreciated that the WLRA basis matrix V (made up of WLRA basis vectors 40) and the neutral vertex positions 42 (vector µ) are common to all of the reconstructions associated with the step 38 WLRA decomposition. Given these common elements, each warped rest region 28' may be considered to be parameterized or represented by its corresponding vector $\vec{z}$ of WLRA weights 44.

Method 10 provides a number outputs that can optionally be employed in other methods described herein. Randomly generated training poses 20 and their corresponding WLRA decompositions 41 (e.g. their corresponding vectors $\vec{z}$ of WLRA weights 44; together with common WLRA basis vectors 40 and neutral vertex positions 42) may be employed as training data 114 in method 100 and the WLRA decompositions 41 may be employed as input for method 200, as discussed further herein.

Figure 6:
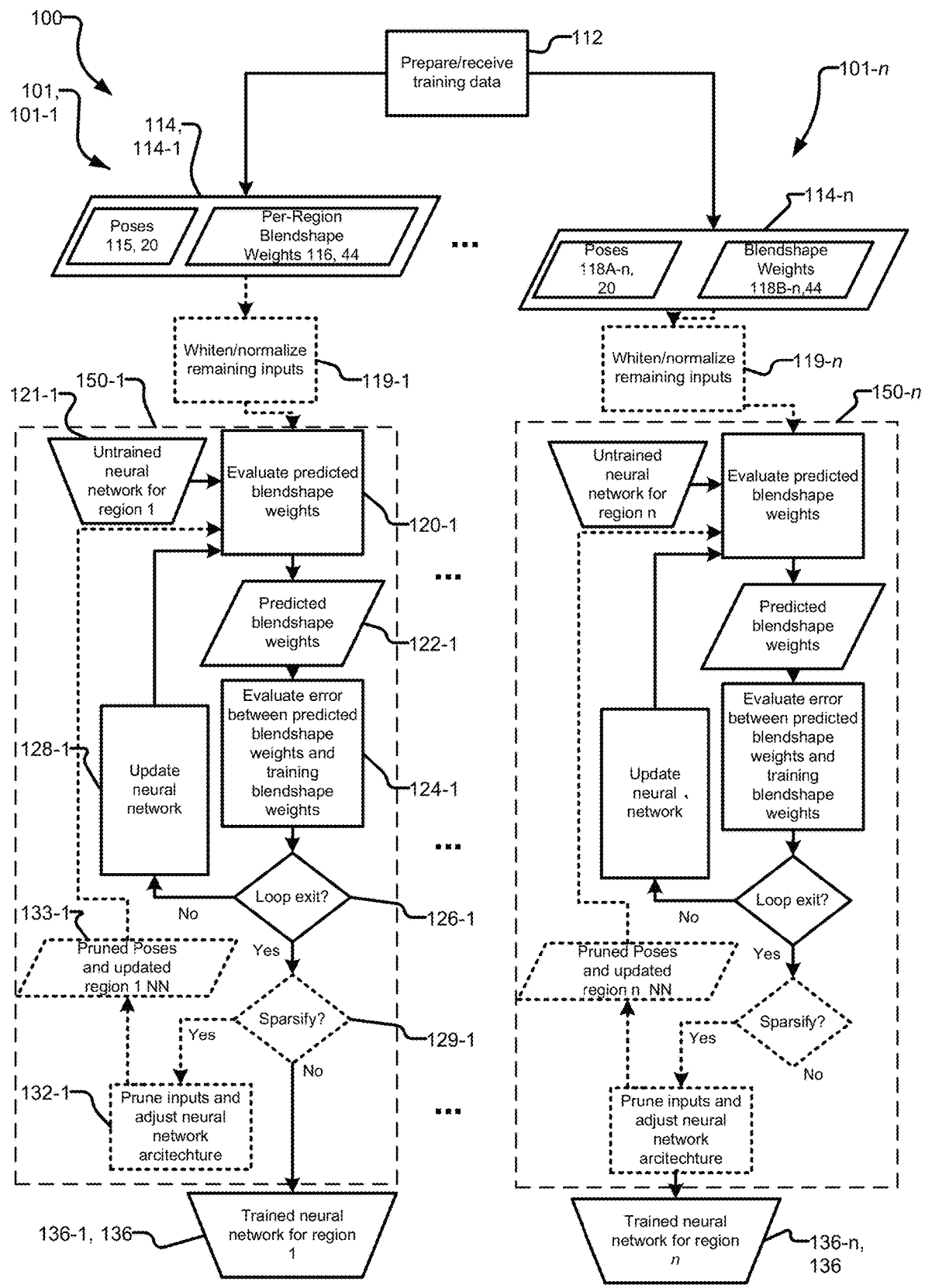
FIG. 6 depicts an exemplary method for training a neural network (or other form of artificial intelligence engine) to simulate realistic deformations of the surface of a character, according to an example embodiment of the invention.

FIG. 6 depicts an exemplary, non-limiting method 100 for training a number of neural networks (NNs) employable for graphically simulating deformation of surface 3 (e.g. skin and/or clothing) of CG character 2 according to a particular embodiment. In the illustrated embodiment, method 100 involves training n NNs 136-1, . . . 136-n (collectively NNs 136), where n is the number of block 26' regions 8 (see FIG. 1). Method 100 comprises a branch (several steps) 101-1, 101-2, . . . 101-n for each of n regions 8. However, for clarity FIG. 6 shows only branches 101-1 and 101-n, it being understood that other branches 101 are analogous. Branches 101-1, 101-2, . . . 101-n may be referred to collectively herein as branches 101.

Method 100 starts at step 112. At step 112, training data 114 is prepared or received. In some embodiments, step 112 may employ method 10 to prepare training data 114. In other embodiments, training data 114 may be prepared otherwise. In some embodiments, training data 114 is prepared separately from method 100 (e.g. by method 10 or otherwise) and training data 114 is merely received at step 112.

As part of step 112, training data 114-1, 114-2, . . . 114-n is provided to each branch 101 of method 100. Training data 114 may comprise training poses 115 which are common to the n branches 101 and, for each training pose 115, a corresponding per-region set of training blendshape weights 116, which are specific to each region. Each of training poses 115 may comprise an array of bone matrices, for example. Training blendshape weights 116 for a particular region may comprise a vector of blendshape weights for each training pose 115. A correspondence between training poses 115 and their corresponding per-region blendshape weights 116 may be maintained by suitable indices, for example.

Training poses 115 may comprise randomly generated training poses 20 from method 10 (FIG. 1), although this is not mandatory. In some embodiments training poses 115 comprise a plurality of poses of character 2 generated otherwise.

Per-region training blendshape weights 116 may comprise per-region WLRA weights 44 obtained from training data preparation method 10 (FIG. 1), although this is not mandatory. In some embodiments, training blendshape weights 116 comprise WLRA weights (or some other form of matrix decomposition or matrix dimensionality reduction weights) otherwise prepared to correspond to particular regions of training poses 115.

Method 100 may train neural networks 136 (or some other form of artificial intelligence engines) for the portions of surface 3 corresponding to each region 8 on a region-by-region basis (e.g. each branch 101 of method 100 may train a corresponding per-region neural network 136). By training neural networks 136 on a region-by-region basis (as opposed to training a single neural network for the entire surface 3) in method 100, the amount of training data 114 may be significantly reduced and the resultant neural networks 136 may provide higher fidelity results. For example, to train an exemplary region 8 containing the left arm, it may be desirable to provide a number, x, of different training poses to train a corresponding neural network 136. If an exemplary second region comprises the right arm, it may be desirable to provide an additional number, x, of different training poses to train a second neural network 136. In this case, a number, 2x, of different training poses would be desirable. In contrast, if both the left arm and the right arm are contained in the same region 8, then it would be desirable to provide a number, x, of different right arm training poses for each of a number, x, of different left arm training poses (e.g. $x^2$ different training poses).

Branch 101-1 of method 100 is now explained in detail. At step 119-1, training data 118-1 may optionally be manipulated in various ways. For example, at step 119-1, the data of poses 118A-1 may be normalized using any suitable technique. In one example embodiment, each training pose of training poses 118A-1 may be provided in the form of bone matrices, for which the components may be organized as a vector and normalization comprises: determining a mean of each component and standard deviation of each component over the set of training poses 118A-1; subtracting the mean from each component of each training pose; and dividing the result by the standard deviation. This normalization produces a set of modified training poses, wherein each component has a zero mean and a standard deviation of unity. In some embodiments, step 119-1 may comprise whitening the data of poses 118A-1. In one example embodiment, each training pose of training poses 118A-1 may be provided in the form of bone matrices, for which the components may be organized as a vector and whitening comprises: determining a mean of each component and standard deviation of each component over the set of training poses 118A-1; subtracting the mean from each component of each training pose; and then applying a rotation to the resultant vectors wherein the rotation is computed so as to remove or minimize correlations between training poses 118A-1. The components of the rotated training poses are then divided by their standard deviations. In some embodiments, step 119-1 may also comprise application of a hyperbolic tangent function, where each component of training poses 118A-1 (or normalized training poses 118A-1 or whitened training poses 118A-1) $x_i$ is replaced by tan $h(x_i)$. The hyperbolic tangent function tan $h(\cdot)$ is a monotonically increasing function with output values between −1 and 1, which makes the input components to the neural network saturate smoothly and prevents high values in the network that can lead to undesirable results.

Method 100 then proceeds to training loop 150-1, which involves training an untrained NN 121-1 for region 1 to generate a trained NN 136-1 for region 1. Untrained NN 121-1 is provided as an input to the first iteration of step 120-1. Untrained NN 121-1 may comprise any suitable neural network and/or other form of artificial intelligence engine. For example, untrained NN 121-1 may comprise a feedforward neural network. In some embodiments, untrained NN 121-1 comprises a multilayer perceptron. In some embodiments, untrained NN 121-1 comprises a radial basis function network. As explained in more detail below, NN 121-1 comprises a number of trainable parameters (e.g. weights and biases) that are iteratively updated during the performance of training loop 150-1. At the conclusion of training loop 150-1, method 100 outputs a trained NN 136-1 for region 1. Training loop 150-1 is now described in more detail.

Step 120-1 comprises using NN 121-1 (untrained in the first iteration and partially trained in successive iterations) to predict blendshape weights 122-1 based on training poses 115. In each iteration of step 120-1, a particular training pose 115 is provided as input to the untrained (or partially trained) NN 121-1 which outputs a set of predicted blendshape weights 122-1.

At step 124-1 of the illustrated embodiment, predicted blendshape weights 122-1 for a particular training pose 115 are compared to training blendshape weights 116 for the particular pose 115 to determine an error metric between predicted blendshape weights 122-1 and training blendshape weights 116. Any suitable error metric or combination of error metrics may be used in step 124-1. For example, in some embodiments, step 124-1 uses one or more of: L1 loss, L2 loss, a loss function that compares triangle edge vectors (each triangle defined by three corresponding vertices) or triangle normals, and/or the like.

In some embodiments, predicted blendshape weights 122-1 could additionally or alternatively be used to reconstruct the per-region deformations associated with each training pose 115 and such reconstructed deformations could be compared to high fidelity deformations (e.g. high fidelity deformations 24 of method 10 (FIG. 1)) in block 124-1 to determine an error metric. While this technique of comparing reconstructed deformations may be more costly in terms of memory and computational resources, this technique of comparing reconstructed deformations may provide some additional flexibility, such as the ability to adjust WLRA basis shapes, the ability to adjust linear blend skinning weights, potentially different error/loss functions and/or the like.

Step 126-1 involves evaluating a loop exit condition. In some embodiments, the step 126-1 loop exit condition comprises evaluating the block 124-1 error metric. In some such embodiments, step 126-1 comprises comparing the step 124-1 error metric to a target error threshold (which may be user-configurable). If the step 124-1 error metric is below the target threshold (block 126-1 YES branch), method 100 continues from step 126-1 to optional step 129-1 (discussed in more detail below) or to output a trained NN 136-1 for first region 8-1. On the other hand, if the step 124-1 error metric is not below the target threshold (block 126-1 NO branch), method 100 returns to step 120-1 via step 128-1. In some embodiments, in addition to or in the alternative to evaluating an error metric in block 126-1, block 126-1 loop exit evaluation may involve evaluating a number of iterations of training loop 150-1. If the number of iterations of training loop 150-1 is less than a threshold (which may be user-configurable), then method 100 may take the block 126-1 NO branch to block 128-1 and back to step 120-1; on the other hand, when the number of iterations reaches the threshold, then method 100 may exit block 126-1 via the YES branch and either proceed to optional step 129-1 (discussed in more detail below) or to complete the training by outputting a trained NN 136-1 for first region 8-1.

In each loop of training method 150-1, NN 121-1 is updated at step 128-1 in an effort to decrease the step 124-1 error metric of NN 121-1. NN 121-1 may comprise a number of trainable parameters (e.g. weights and biases). The step 128-1 update may be referred to as back propagation in the field of machine learning and artificial intelligence and may involve application of incremental changes to the trainable parameters of NN 121-1. The directions of the incremental changes to the trainable parameters of may be determined by taking partial derivatives (gradients) of an objective function with respect to each trainable parameter and then incrementing the parameters in directions of the gradients that tend to minimize the objective function. The objective function used for back propagation in step 128-1 may be that same as or may incorporate the function used to determine the step 124-1 error metric (although this is not necessary). In some embodiments, the step 128-1 of updating NN 121-1 may make use of the Adam optimization technique with its meta-parameters described, for example, in Kingma, Diederik & Ba, Jimmy. (2014). Adam: A Method for Stochastic Optimization. International Conference on Learning Representations, which is hereby incorporated herein by reference.

As alluded to above, when method 100 exits block 126-1 from the YES branch, then method 100 may continue to optional sparsification evaluation step 129-1. Sparsification evaluation step 129-1 determines whether it might optionally be desirable to prune (or sparsify) the input data provided to the region 8-1 neural network 121-1 in step 120-1. The block 129-1 evaluation may involve comparing the number of sparsification iterations to a suitable threshold. If the number of sparsification iterations is less than the threshold, then the block 129-1 evaluation may be positive (YES branch) and if the number of sparsification iterations reaches the threshold, the block 129-1 evaluation may be negative (NO branch). Where sparsification (or further sparsification) is not desired, then method 100 exits block 129-1 on the NO branch and outputs trained neural network 136-1. In some instances, however, it may be desirable sparsify or prune the input data provided to the region 8-1 neural network 121-1 in step 120-1 which corresponds to the block 129-1 YES output branch.

If the block 129-1 inquiry is positive, then method 100 proceed to block 132-1 which involves sparsifying or pruning the input data provided to the region 8-1 neural network 121-1 and making corresponding adjustments to the architecture of neural network 121-1. For example, in some embodiments, where poses 115 are provided in the form of or otherwise comprise bone matrices, sparsification in step 132-1 may involve reducing the number of bone matrix components of poses 115 received by NN 121-1 at step 120-1 by ignoring or rejecting components (of bones matices) that have little or no effect on corresponding deformations. For example, the angle of the right big toe joint will have very little effect on the surface deformations of the region containing the left shoulder and, consequently, such components can be pruned away from the inputs for the region containing the left shoulder.

In some embodiments, step 132-1 comprises back-propagating noise data through NN 121-1 to determine which inputs (e.g. components of bone matrices of poses 115) have a substantive impact on the output of NN 121-1 (e.g. predicted blendshape weights 122-1). When it is determined that an input does not have a substantive effect on the output of NN 121-1 (e.g. on the predicted blendshape weights 122-1), which may be determined using a suitable thresholding process, then input poses 115 may be updated to remove that input component. Step 132-1 may also comprise adjusting the architecture of the untrained neural network 121-1 (e.g. to accommodate a different number of inputs). The output of step 132-1 may comprise a new architecture for neural network 121-1 and a pruned set of input training poses 133-1. After step 132-1, method 100 may continue back to step 120-1, where the training of neural network 121-1 (e.g. steps 120-1, 124-1, 16-1 and 128-1) is restarted with the new NN architecture for neural network 121-1 and the pruned set of input poses 133-1. The optional sparsification steps (steps 129-1 and 132-1) of method 100 may improve the efficiency of trained NN 136-1 that is output by method 100 and may reduce the common problem of over-fitting that occurs when a NN has more nodes than is strictly necessary.

In some embodiments, step 132-1 may prune or sparsify the input data of poses 115 (e.g. to reduce the number of bone matrix components of poses 115 received by NN 121-1 at step 120-1) and alter the corresponding architecture of NN 121-1 by employing a method based on those disclosed by Molchanov et al., Variational Dropout Sparsifies Deep Neural Networks, Proceedings of the $34^{th}$ International Conference on Machine Learning, vol. 70, August 2017, 2498-2507 (Molchanov et al.), which is hereby incorporated herein by reference. For example, by providing neural network 121-1 with a layer of one-to-one connections to input data of poses 115, reducing the number of connections according to methods disclosed by Molchanov et al. may effectively reduce the number of inputs of data of poses 115 (e.g. the number of bone matrix components of poses 115 received by NN 121-1 at step 120-1).

As discussed above, at the conclusion of training loop 150-1, method 100 outputs a trained NN 136-1 for first region 8-1.

It should be understood that the other branches 101-2, 101-3, . . . 101-n of method 100 comprises similar steps to those described in relation to branch 101-1 first region 8-1 for each other region 8-2, 8-3, . . . 8-n, even though FIG. 6 only explicitly shows the steps for the first region 8-1 and the $n^{th}$ region 8-n. In this way, method 100 also outputs similar trained NNs 136-1, 136-2, 136-3 . . . 136-n for each region 8. Trained NNs 136 may be employed in surface simulation/animation method 200 (FIG. 7), or otherwise. It will be appreciated that for a given pose of a given region 8 of an animation rig 4 (e.g. joint angles and/or bone positions as may be specified by bone matrices), a corresponding one of trained NNs 136 will output a set of predicted blendshape weights which may be used (together with a blendshape basis and neutral vertex positions (e.g. WLRA blendshape basis 40 and neutral vertex positions 42 generated in method 10), as described above) to reconstruct a warped deformation of a surface 30 of a CG character for the given region 8 in the rest pose coordinate system.

Figure 7:
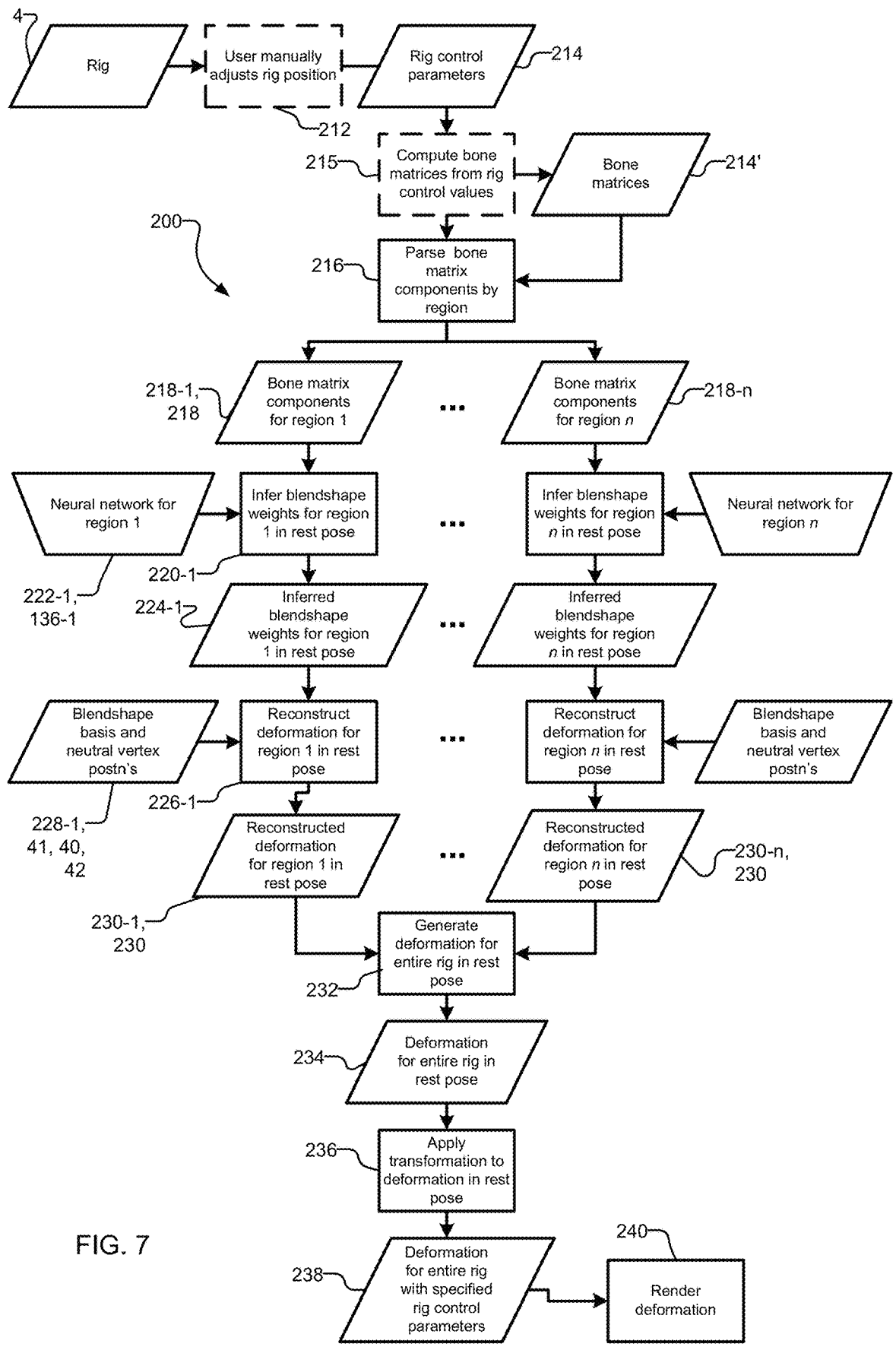
FIG. 7 depicts an exemplary method for employing a neural network (or other form artificial intelligence engine) to simulate realistic deformations of the surface of a character, according to an example embodiment of the invention.

FIG. 7 depicts an exemplary, non-limiting method 200 for graphically simulating and rendering deformation of the surface 30 (e.g. skin and/or clothing) of a CG character 2 according to a particular embodiment. In some embodiments, blocks 216-240 of method 200 may be performed in real time—e.g. once per animation frame at frame rates of 6 fps-150 fps, for example. In some embodiments, blocks 215-240 of method 200 may be performed in real time—e.g. once per animation frame at frame rates of 6 fps-150 fps, for example.

Method 200 optionally starts with step 212. At step 212, a user may manually control a rig 4 (e.g. moves digital bones 6 of rig 4) or rig 4 may otherwise be controlled to obtain rig control values 214. Rig 4 may be controlled directly by a user (e.g. by manipulating handles 5) or may be controlled by software which is configured to control rig 4. It is not necessary that rig 4 be manually controlled. In some embodiments, rig 4 may also be simulated. Rig 4 may output rig control values or parameters 214, which represent the position of the rig (e.g. for a single frame of animation or on a frame-by-frame basis). Rig control values 214 may be in the form of a plurality of bone matrices 214'. In other embodiments, method 200 comprises a step 215 for assembling bone matrices 214' from rig control values 214. Blocks 212 and 215 are optional. In some embodiments, per-frame bone matrices 214' may be provided as input to method 200.

In some embodiments, method 200 starts at step 216 and receives per-frame bone matrices 214' as input. In some embodiments, method 200 starts at block 212 and/or at block 215 and determines per-frame bone matrices 214'. Block 216 and the remainder of method 200 may be performed once per frame (e.g. per frame of animation). At step 216, components of bone matrices 214' are isolated based on the region specific components selected after optional sparsification (e.g. in one or more iterations of step 132-1 of method 100). Step 216 outputs bone matrix components 218 parsed into regions 8-1, 8-2, . . . 8-n. For example, bone matrix components for first region 8-1 are output as bone matrix components 218-1 and bone matrix components for the $n^{th}$ region are output as bone matrix components 218-n.

After bone matrix components 214 are parsed by region 8, method 200 may proceed on a region-by-region basis. In the illustrated embodiment, steps 218-1 to 230-1 for the first region 8-1 are illustrated in parallel with steps for each other region 8 (such as for the $n^{th}$ region as depicted in FIG. 7). However, steps 218-1 to 230-1 for first region 8-1 could occur in series with similar steps for one or more other regions 8. For brevity, the method 200 procedures are only described herein for region 8-1, it being understood that the procedures for other regions may be performed in an analogous manner. In other words, while steps 218-1 to 230-1 are described for region 8-1, it should be understood that the steps for each of the other regions 8 are substantially similar except that the bone matrix components for that region 8 are input into a NN for that region 8 to obtain a deformation for that region 8 in the rest post coordinate system (e.g. deformation 230-1 for first region 8-1 in the rest pose coordinate system and deformation 230-n for $n^{th}$ region 8-n in the rest pose coordinate system).

By proceeding on a region-region-basis for at least some steps of method 200, it is possible to reduce the computational resources required by method 200 and/or increase the speed of method 200. Since only components of bone matrices 214' that are relevant to a particular region 8 are included in steps for that particular region 8, unnecessary information related to digital bones 6 outside of the region 8 can be ignored.

At step 220-1 an neural network 222-1 is employed to generate (e.g. infer) blendshape weights 224-1 which in turn may be used (together with a blendshape basis and neutral vertex positions, as described above and below) to reconstruct a warped deformation of the surface 30 for the first region 8-1 in the rest pose coordinate system. NN 222-1 may comprise any suitable NN trained to receive bone matrix components 218-1 for first region 8-1 and output corresponding inferred blendshape weights 224-1, which in turn may be used (together with a corresponding blendshape basis and corresponding neutral vertex positions, as described above and below) to reconstruct a warped deformation of the surface 30 for first region 8-1 in the rest pose coordinate system. In currently preferred embodiments, NN 222-1 comprises trained NN 136-1 trained according to method 100 and inferred blendshape weights 224-1 may be an inferred set of blendshape weights 224-1 corresponding to WLRA decomposition 41 (e.g. corresponding to WLRA blendshape basis 40 and WLRA neutral vertex positions 42) obtained in method 10 for developing training data, although this is not mandatory.

Once the blendshape weights 224-1 are inferred in step 220-1, method 200 proceeds to step 226-1, where the inferred blendshape weights 224-1 are used together with blendshape decomposition parameters 228-1 (e.g. a blendshape basis and a set of neutral vertex positions) to reconstruct a reconstructed deformation 230-1 for first region 8-1 in the rest pose coordinate system. In currently preferred embodiments, blendshape decomposition parameters 228-1 comprise the blendshape (WLRA) basis vectors 40 and neutral vertex positions 42 obtained for region 1 in data preparation method 10 described above.

At step 232, the reconstructed deformations 230 for each region 8 are stitched together to obtain a deformation 234 for the entirety of rig 4 of character 2 in the rest pose coordinate system. Where a region 8 overlaps with another region 8 (i.e. a vertex of surface 30 belongs to more than one region 8), the reconstructed deformations 230 may be computed based on a sum or average of deformations determined for each such region on a vertex by vertex basis. In some embodiments, vertices belonging to more than one region will have per-region weights (e.g. per-region weights 80 contemplated in method 60 (FIG. 1A) or per-region weights that form part of block 28' in method 10 (FIG. 1)) associated with each region in which case reconstructed deformations 230 may be computed based on a weighted sum or weighted average of deformation determined for each such region.

At step 236, a transformation is applied to deformation 234 to convert deformation 234 from the rest pose coordinate system to a corresponding deformation 238 in the final pose coordinate system. This step 236 transformation may be the inverse of the transformation applied in step 26 of method 10 (FIG. 1). In some embodiments, linear blend skinning is employed to effect the step 236 transformation (and the corresponding step 26 transformation). In other embodiments, dual quaternion skinning, spherical blend skinning and/or another method is employed to effect the step 236 transformation (and the corresponding step 26 transformation) to obtain deformation 238 in the final pose coordinate system. The last step 240 in method 200 involved rendering the surface deformation 238 in its pose coordinate system. Rendering a 2D image based on a corresponding 3D mesh (like that of surface deformation 238) is a well understood process in the field of CG animation.

Figure 8B:
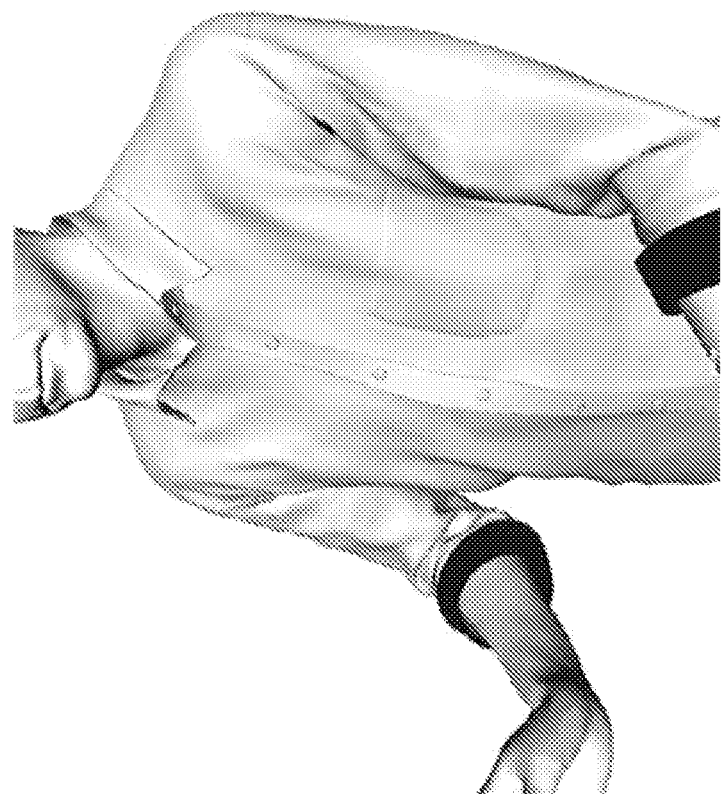
FIG. 8B depicts an exemplary simulation of deformation of the FIG. 8 shirt employing methods described herein.
Figure 8A:
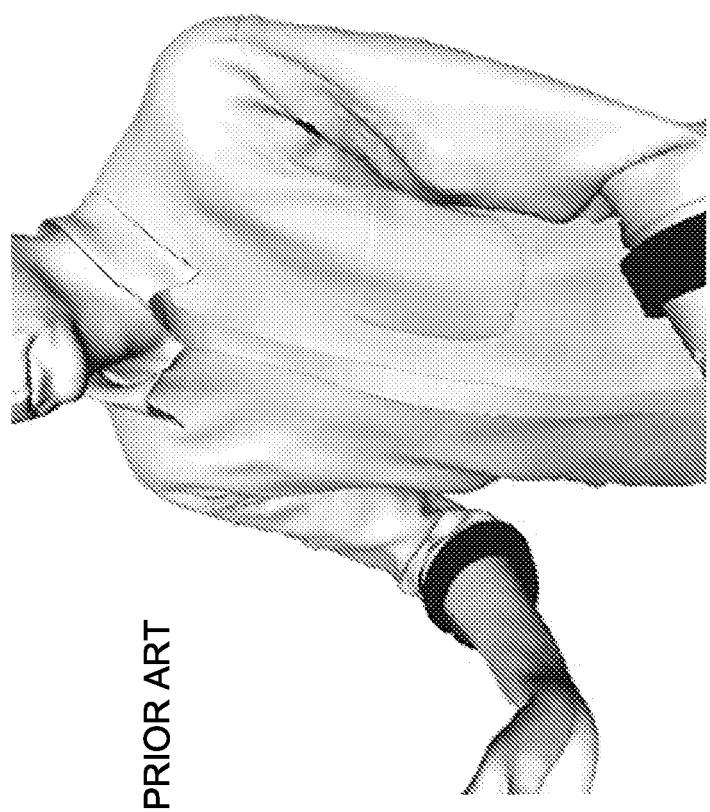
FIG. 8A depicts an exemplary simulation of deformation of a shirt employing a prior art method.

FIG. 8A depicts a shirt deformed according to a traditional technique while FIG. 8B depicts a shirt deformed according to the methods described herein. As can be seen by comparing FIGS. 8A and 8B, the methods described herein provide a faithful reproduction of the deformations.

Figure 9:
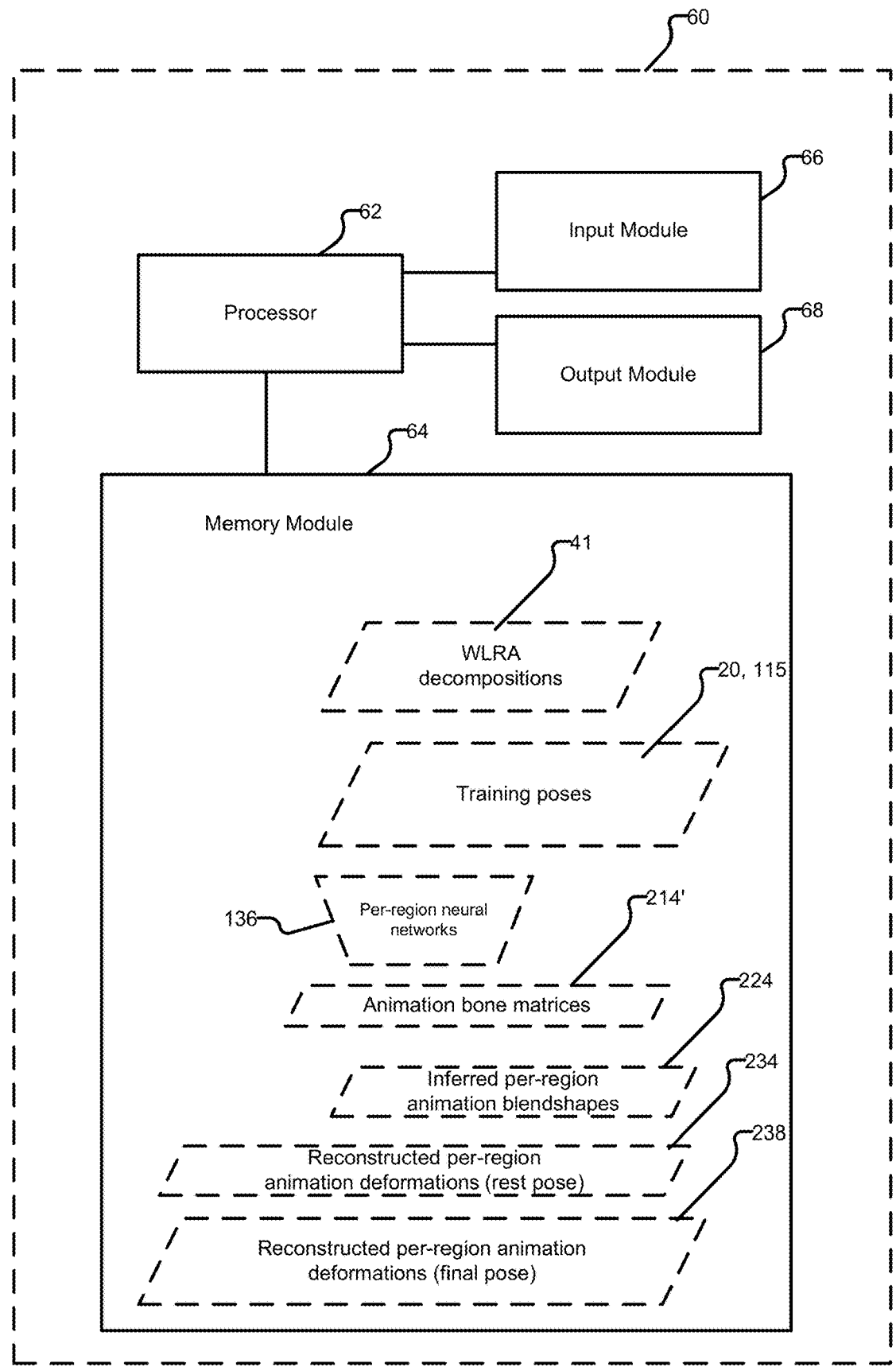
FIG. 9 is a schematic diagram of a computer (processing) system that can be used to perform the various methods of various embodiments.

Some aspects of the invention provide a system 60 (an example embodiment of which is shown in FIG. 9) for performing one or more of the methods described herein (e.g. training data preparation method 10 of FIG. 1, NN training method 100 of FIG. 6, simulation/animation/rendering method 200 of FIG. 7 and/or or portions thereof). System 60 may comprise a processor 62, a memory module 64, an input module 66, and an output module 68. Memory module 64 may store any of the data (including inputs, outputs and intervening data), neural networks and/or representations described herein. Memory module 64 of the illustrated FIG. 9 embodiment shows a non-limiting representative sample of the information that may be stored therein. Processor 62 may receive (via input module 66) any of the inputs to any of the methods described herein and may store these inputs in memory module 64. Processor 62 may perform method 10 to prepare training data (including WLRA decompositions 41) which may be stored in memory module 64 together with their corresponding poses 20, 115. Processor 62 may use this training data or other training data to perform method 100 to train per-region neural networks 136 which may be stored in memory module 64. Processor 62 may use these trained neural networks 136 together with animation bone matrices 214' to infer per-region blendshapes 224 and to reconstruct corresponding per-region deformations 230 and may combine these per-region deformations to generate complete pre-frame 3D surface deformations in the rest pose 234 and in their final poses 238. Processor 62 may then render these deformations 238 via output module 68.

Where a component is referred to above, unless otherwise indicated, reference to that component (including a reference to a "means") should be interpreted as including as equivalents of that component any component which performs the function of the described component (i.e. that is functionally equivalent), including components which are not structurally equivalent to the disclosed structure which performs the function in the illustrated exemplary embodiments of the invention.

Unless the context clearly requires otherwise, throughout the description and any accompanying claims (where present), the words "comprise," "comprising," and the like are to be construed in an inclusive sense, that is, in the sense of "including, but not limited to." As used herein, the terms "connected," "coupled," or any variant thereof, means any connection or coupling, either direct or indirect, between two or more elements; the coupling or connection between the elements can be physical, logical, or a combination thereof. Additionally, the words "herein," "above," "below," and words of similar import, shall refer to this document as a whole and not to any particular portions. Where the context permits, words using the singular or plural number may also include the plural or singular number respectively. The word "or," in reference to a list of two or more items, covers all of the following interpretations of the word: any of the items in the list, all of the items in the list, and any combination of the items in the list.

Embodiments of the invention may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method and/or to provide the functionality as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs"). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods and/or provide functionality as described herein by executing software instructions in a program memory accessible to the processors.

Software and other modules may reside on servers, workstations, personal computers, tablet computers, image data encoders, image data decoders, PDAs, media players, PIDs and other devices suitable for the purposes described herein. Those skilled in the relevant art will appreciate that aspects of the system can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, network PCs, mini-computers, mainframe computers, and the like.

While processes or blocks of some methods are presented herein in a given order, alternative examples may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. In addition, while elements are at times shown as being performed sequentially, they may instead be performed simultaneously or in different sequences. It is therefore intended that the following claims are interpreted to include all such variations as are within their intended scope.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

The invention claimed is:

1. A method for preparing training data for training a neural network to simulate deformations of a surface of a CG character, the method comprising:
   obtaining a distribution of joint angles and/or bone positions of a CG character over a set of animation data comprising a plurality of frames;
   randomly generating a plurality of random poses according to the distribution of joint angles and/or bone positions;
   generating a high-fidelity deformation of the surface of the CG character for each of the plurality of random poses;
   transforming each of the high-fidelity deformations from a respective pose coordinate system to a rest pose coordinate system to obtain a plurality of warped rest poses, each warped rest pose corresponding to one of the high-fidelity deformations and one of the random poses and each warped rest pose parameterized at least in part by a three-dimensional (3D) surface mesh comprising a plurality of vertices;
   parsing the warped rest poses into a plurality of regions to obtain, for each warped rest pose, a corresponding plurality of warped rest regions, each warped rest region parameterized at least in part by a regional three-dimensional (3D) surface mesh comprising a regional plurality of vertices from among the plurality of vertices of the vertices of the warped rest pose;
   determining an approximation weight for each regional vertex of each of the plurality of warped rest regions;
   for each region:
      decomposing the warped rest region over the plurality of warped rest poses to obtain, for the region: a regional decomposition neutral vector, a regional set of decomposition basis (blendshape) vectors and, for each warped rest pose, a regional set of decomposition weights;
      wherein, for each warped rest pose, the corresponding regional set of decomposition weights together with the regional decomposition neutral vector and the regional set of decomposition basis (blendshape) vectors can be used to at least approximately reconstruct the warped rest region of the warped rest pose;
      wherein decomposing the warped rest region over the plurality of warped rest poses is based at least in part on the approximation weights; and
   determining the training data to comprise the plurality of random poses and, for each random pose and for each region, the corresponding set of decomposition weights.

2. A method according to claim 1 wherein determining the approximation weight for each regional vertex of each of the plurality of warped rest regions comprises, for each regional vertex of each of the plurality of warped rest regions, determining a derivative of a position of the regional vertex in the warped rest region with respect to a position of the vertex in the corresponding high-fidelity deformation.

3. A method according to claim 2 wherein the approximation weight for each regional vertex of each of the plurality of warped rest regions is inversely proportional to the determined derivative of the position of the regional vertex in the warped rest region with respect to a position of the vertex in the corresponding high-fidelity deformation.

4. A method according to claim 1 wherein, for each region, decomposing the warped rest region over the plurality of warped rest poses comprises determining a regional basis size (e.g. a number of regional decomposition basis (blendshape) vectors in the set of regional decomposition basis (blendshape) vectors).

5. A method according to claim 4 wherein determining the basis size comprises performing one or more principal component analysis (PCA) decompositions of the warped rest region over the plurality of warped rest poses and determining the basis size based on the one or more PCA decompositions.

6. A method according to claim 1 wherein decomposing the warped rest region over the plurality of warped rest poses comprises performing a weighted low rank approximation (WLRA) decomposition based on the warped rest region over the plurality of warped rest poses and the approximation weights.

7. A method according to claim 1 wherein at least some of the warped rest regions share at least some vertices from among their respective regional pluralities of vertices.

8. A method according to claim 7 wherein parsing the warped rest poses into the plurality of regions comprises assigning per-region weights to vertices that are shared between warped rest regions.

9. A method according to claim 1 wherein:
   each random pose is parameterized at least in part by a number of bones (num_bones) and, for each bone, a set of bone matrix components, the num-bones sets of bone matrix components together characterizing the joint angles and/or bone positions of the random pose; and
   parsing the warped rest poses into the plurality of regions comprises:
      determining a correlation between each coordinate of each vertex of each warped rest pose and each bone matrix component over the plurality of warped rest poses;
      clustering the vertices into n clusters based at least in part on the determined correlations; and
      dilating the n clusters to determine n warped rest regions, one warped rest region corresponding to each cluster, wherein the regional plurality of vertices for each warped rest region comprises the vertices in its corresponding cluster and one or more vertices from neighboring clusters; and
      assigning per-region weights to vertices that belong to more than one warped rest region.

10. A method according to claim 9 wherein dilating the n clusters to determine n warped rest regions comprises, for each warped rest region, determining the one or more vertices from neighboring clusters to be within a threshold distance metric from at least one of the vertices in the cluster corresponding to the warped rest region.

11. A method according to claim 10 wherein assigning per-region weights to vertices that belong to more than one warped rest region comprises, for each particular vertex belonging to more that one warped rest region, performing an averaging process of the per-region weights of other vertices within the threshold distance metric from the particular vertex.

12. A method according to claim 11 wherein performing the averaging process comprises performing a weighted averaging process, wherein weights for the weighted averaging process are determined at least in part on distance metrics of the other vertices relative to the particular vertex.

13. A method according to claim 1 wherein the animation data comprises the joint angles and/or bone positions.

14. A method according to claim 1 wherein obtaining the distribution of joint angles and/or bone positions of the CG character over the set of animation data comprises: receiving the set of animation data of the CG character; and determining the distribution of joint angles and/or bone positions of the CG character in each frame of the set of animation data.

15. A method according to claim 14 wherein the distribution of joint angles and/or bone positions of the character in the animation comprises a multivariate Gaussian distribution of the joint angles and/or bone positions of the CG character over the plurality of frames of the set of animation data.

16. A method according to claim 1 wherein the joint angles and/or bone positions are parameterized at least in part by a plurality of bones and, for each bone, a corresponding bone matrix.

17. A method according to claim 1 wherein each random pose is parameterized at least in part by a plurality of bones and, for each bone, a bone matrix comprising a set of bone matrix components, the plurality of sets of bone matrix components together characterizing the joint angles and/or bone position of the random pose.

18. A method for preparing training data for training a neural network to simulate deformations of a surface of a CG character, the method comprising:
    obtaining a distribution of joint angles and/or bone positions of a CG character over a set of animation data comprising a plurality of frames;
    randomly generating a plurality of random poses according to the distribution of joint angles and/or bone positions;
    generating a high-fidelity deformation of the surface of the CG character for each of the plurality of random poses;
    transforming each of the high-fidelity deformations from a respective pose coordinate system to a rest pose coordinate system to obtain a plurality of warped rest poses, each warped rest pose corresponding to one of the high-fidelity deformations and one of the random poses and each warped rest pose parameterized at least in part by a three-dimensional (3D) surface mesh comprising a plurality of vertices;
    determining an approximation weight for each vertex of each of the plurality of warped rest poses;
    decomposing the plurality of warped rest poses to obtain: a decomposition neutral vector, a set of decomposition basis (blendshape) vectors and, for each warped rest pose, a set of decomposition weights;
    wherein, for each warped rest pose, the corresponding set of decomposition weights together with the decomposition neutral vector and the set of decomposition basis (blendshape) vectors can be used to at least approximately reconstruct the warped rest pose;
    wherein decomposing the plurality of warped rest poses is based at least in part on the approximation weights; and
    determining the training data to comprise the plurality of random poses and, for each random pose, the corresponding set of decomposition weights.

19. A method for training a neural network to simulate deformations of a surface of a CG character, the method comprising:
    (a) receiving training data comprising training poses and, for each training pose, a plurality of sets of training blendshape weights, each set of blendshape weights corresponding to a region of the surface of the CG character; and
    for each region:
    (b) employing an untrained or partially trained neural network comprising a plurality of trainable parameters to predict blendshape weights based on one of the plurality of training poses;
    (c) determining an error metric, the error metric based at least in part on the predicted blendshape weights and the set of training blendshape weights corresponding to the region and the one of the plurality of training poses;
    (d) updating the trainable parameters of the neural network based at least in part on the error metric;
    (e) evaluating a loop exit criteria and:
        if the loop exit criteria is satisfied, proceeding to step (f); or
        if the loop exit criteria is not satisfied, repeating steps (b), (c), (d) and (e) with a different one of the plurality of training poses; and
    (f) parameterizing the trained neural network based on at least in part on the updated trainable parameters after the last iteration of step (d).

20. A method according to claim 19 wherein the training data is obtained by the method of claim 1.

* * * * *